United States Patent [19]

Oliver et al.

[11] Patent Number: 5,646,942

[45] Date of Patent: Jul. 8, 1997

[54] SIMULCAST TRANSMISSION OF DIGITAL PROGRAMS TO SHARED ANTENNA RECEIVING SYSTEMS

[75] Inventors: Brian D. Oliver, Oakton, Va.; Bruce Kostreski, Wheaton, Md.; W. Tim Campbell, Alexandria; Kamran Sistanizadeh, Arlington, both of Va.

[73] Assignee: Bell Atlantic Network Services, Inc., Arlington, Va.

[21] Appl. No.: 409,574

[22] Filed: Mar. 24, 1995

Related U.S. Application Data

[63] Continuation-in-part of Ser. No. 405,558, Mar. 16, 1995.

[51] Int. Cl.⁶ .................................................. H04B 7/02
[52] U.S. Cl. ...................... 370/112; 375/347; 455/33.3; 348/385
[58] Field of Search ............................. 375/229, 232, 375/257, 347, 299; 370/73, 108, 112, 110.1, 69.1, 32.1; 455/6.1, 6.3, 51.1, 33.3, 51.2, 272, 277.2, 275; 348/460, 558, 7, 12, 13, 21, 423, 385, 387

[56] References Cited

U.S. PATENT DOCUMENTS

| | | |
|---|---|---|
| 2,629,816 | 2/1953 | Rabuteau . |
| 3,836,726 | 9/1974 | Wells et al. . |
| 4,255,814 | 3/1981 | Osborn . |
| 4,547,804 | 10/1985 | Greenberg ................. 340/460 |
| 4,718,109 | 1/1988 | Breeden et al. . |
| 4,805,020 | 2/1989 | Greenberg ................. 348/460 |
| 4,932,049 | 6/1990 | Lee ........................... 379/60 |
| 5,038,403 | 8/1991 | Leitch ....................... 455/51 |
| 5,117,503 | 5/1992 | Olson ........................ 455/51.1 |
| 5,127,101 | 6/1992 | Rose, Jr. ................... 455/51.1 |
| 5,128,925 | 7/1992 | Dornstetter et al. ....... 370/100.1 |
| 5,203,018 | 4/1993 | Hirose ....................... 375/267 |
| 5,230,086 | 7/1993 | Saul .......................... 455/51.1 |
| 5,231,494 | 7/1993 | Wachob ..................... 358/146 |
| 5,239,671 | 8/1993 | Linquist et al. ............ 455/13.1 |
| 5,239,672 | 8/1993 | Kurby et al. ............... 455/51.2 |
| 5,243,598 | 9/1993 | Lee ........................... 370/95.3 |
| 5,268,933 | 12/1993 | Averbuch ................. 455/56.1 |
| 5,274,666 | 12/1993 | Dowdell et al. .......... 455/51.1 |
| 5,355,529 | 10/1994 | Linquist et al. ........... 455/13.1 |
| 5,404,575 | 4/1995 | Lehto ........................ 455/51.1 |
| 5,437,052 | 7/1995 | Hemmie et al. ........... 455/6.1 |

OTHER PUBLICATIONS

Lengoc et al., "Block Downconverters for Wireless CATV", 1989 pp. 827–829.

*Primary Examiner*—Benedict V. Safourek
*Assistant Examiner*—Chau T. Nguyen
*Attorney, Agent, or Firm*—Lowe, Price, LeBlanc & Becker

[57] ABSTRACT

Within a desired service area, multiple transmitters at separately located sites simultaneously broadcast the same multi-channel, multi-program signal. Broadcast waves from the transmitters propagate throughout substantially overlapping portions of the service area. Obstructions in the service area, e.g. mountains, buildings, trees, etc., may block reception from one or more of the transmitters at certain sites. However, at most receiving sites, the receiving antenna can receive a clear line-of-sight transmission from at least one and often two or more of the transmitters. Each broadcast channel carries a multiplexed digital data stream containing packets of information for a plurality of programs, e.g. television programs. A shared antenna system, typically including multiple receiving antennae aimed at a plurality of the transmitters, supplies received signals to terminals in a plurality of living units. The shared system includes processing circuitry to supply an optimal signal from the receiving antennae to the terminals.

46 Claims, 14 Drawing Sheets

SIMULCAST TRANSMISSION OF DIGITAL PROGRAMS TO SHARED ANTENNA RECEIVING SYSTEMS

CROSS-REFERENCE TO RELATED APPLICATION

This application is a continuation in part of copending U.S. patent application Ser. No. 08/405,558 filed Mar. 16, 1995 entitled "SIMULTANEOUS OVERLAPPING BROADCASTING OF DIGITAL PROGRAMS", the disclosure of which is incorporated herein in its entirety by reference.

TECHNICAL FIELD

The present invention relates to wireless distribution of program information, e.g. video, audio and data, particularly to shared antenna receiving systems serving multiple living units. More specifically, the present invention relates to simultaneous distribution of multiple RF channels from separately located transmitters to such receiving systems, wherein each RF channel carries a digital transport stream containing multiplexed data relating to a plurality of different programs.

BACKGROUND ART

"Wireless cable" is a term usually used to refer to a multi-channel video distribution medium that resembles franchise cable television, but which uses microwave channels rather than coaxial cable or wire to transmit programming to the subscriber. Programing for wireless cable systems is received at the headend of the wireless cable system in the same manner as it is for landline based cable television. These programs are then re-transmitted, utilizing the high end of the Ultra High Frequency (UHF) portion of the microwave radio frequency spectrum (2.1 to 2.7 Ghz), by a microwave transmitting antenna located on a tower or other tall structure to small antennas on subscriber rooftops, typically within a 40 mile radius.

In a typical prior art system, such as shown in FIG. 1, a headend system H receives up to a maximum of 33 analog television program signals from a variety of satellite downlink receivers and other types of receivers, in the exact same manner as for a cable television system. The headend system H frequency multiplexes those television program signals into a combined spectrum signal in the 50–450 Mhz range. This combined signal has a frequency distribution similar to that found on a cable television network. The headend system upconverts the combined spectrum signal to the UHF frequency range, typically centered around 2.6 Ghz. The headend system supplies the UHF signal to a single transmitter antenna tower T which broadcasts the signal to subscribers who each have an individual home receiving system. Subscribers can call in to the headend to order pay-per-view events via the telephone network, and the headend transmits codes to the subscribers systems to enable descrambling of encoded pay-per-view programs.

FIG. 1A shows a typical service area for a wireless cable type system of the type shown in FIG. 1. In accord with relevant regulations, a multi-channel multi-point distribution service (MMDS) type wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel(s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at a receiver location by direct line-of-sight (LOS) transmission. Typically an elliptical dish shaped antenna 18–36 inches long, formed of parallel curved elements, is aimed from the subscriber location to receive the strongest signal from the transmitter. The captured signals are down-converted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the UHF antenna to pick up the local programming.

To a user or subscriber, wireless cable operates as a cable look-alike service. Because wireless cable signals are transmitted over the air rather than through underground or above-ground cable networks, wireless systems are less susceptible to outages and are less expensive to operate and maintain than franchise cable systems. Most service problems experienced by wireless cable subscribers are home-specific rather than neighborhood-wide, as is frequently the case with franchise cable systems.

The evolution of wireless cable may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. Rules reallocated eight of those channels for outright commercial use, and educational organizations were permitted to lease excess hours to commercial operators on the remaining 20 channels. In any local market, this makes it possible for a commercial operator to combine any or all of those 28 channels with five other channels already available for commercial use. Under current FCC rules, the available spectrum results in a maximum of 33 analog channels. This number of 'wireless cable' channels is less than the number offered on many competing franchise type cable television systems.

Since 1983 spectrum blocks in the 2.1–2.7 Ghz range have been allocated for the purpose of delivering video content from a single transmit site to multiple receive locations. A total of 198 Mhz has been allocated for downstream transmission for the wireless cable service. The channelization and transmission modulation (6 Mhz amplitude modulation/vestigial side band) are equivalent to broadcast TV or cable but up-converted to microwave frequencies.

The 33 channels potentially available to wireless cable operators therefore are subdivided into two types of channels. Twenty channels are referred to as ITFS. The remaining 13 channels are generally referred to as Multi-channel Multipoint Distribution Service (MMDS).

The current UHF spectrum was originally licensed in blocks of four video channels each separately licensed, with each block allocated to a specific purpose. Five groups, each with four channels, were allocated to Instructional Television Fixed Service (ITFS). ITFS spectrum was initially made available only to educational institutions. Two groups of four channels were made available to anyone wishing to provide an alternative multi-channel video program service. The final four channels were licensed individually to institutions for the purpose of providing a private video network. Over time, the FCC relaxed some of these operational rules. Through licensing and leasing arrangements, the FCC now allows all of the channels to be aggregated for the purpose of providing an alternative to franchise cable television. However, even in areas where it is possible for one operator to aggregate the necessary licenses, the system capacity is still limited, i.e. to 33 channels or less.

In many ways, current typical UHF wireless TV is equivalent to at most a low tier franchise cable television system (i.e. having relatively few channels). Other than the number of program channels, the only real difference arises in the medium used to transport signals from the headend to the customer. Functionally identical headend equipment is utilized in both systems. In the case of UHF service, signals leave the headend via a microwave transmitter. With cable television, the same signals leave the headend on fiber or coaxial cable facilities. However, wireless cable systems have had difficulty competing because today many cable systems offer a more diverse range of programs.

Propagation characteristics at the relevant UHF operating frequencies require line-of-sight (LOS) between the transmit and receive antennas for reliable service reception. Both natural obstructions such as hills and vegetation, and man-made obstructions such as buildings, water towers and the like, limit the actual households capable of receiving an LOS transmission. FIG. 1A also shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low, and overcoming blockages due to distortions that result when amplifying combined RF channels caused by many different obstructions to the primary transmissions would require an inordinate number of repeaters. Also, because of delays and multipath effects, repeater transmissions may interfere with reception from the primary source in areas close to the blockage area B.

In the industry, a nominal figure for households reachable by LOS is 70%, even with a small, commercially practical number of repeaters. This projected number is based solely on computer models, not actual field measurements. It is believed that actual coverage by the current wireless cable technology in the UHF medium is considerably lower. Typical antenna heights required to achieve the present level of coverage in commercial service are 800-plus feet for transmitters and 30–60 feet for receivers. That means that many receive antennas must be mounted atop masts or nearby trees as an alternative to a rooftop mounting. While current regulations provide a 15 mile protected service area for MMDS, it is desired that effective system coverage for approximately 40–70% of the affected households may be achieved to a 40 mile radius from the transmitter antenna.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., rain or temperature and pressure inversions. Rain can act to partially reflect or absorb the microwave signals. Weather inversions can result in an upward bending of the wave front due to refraction. There are engineering measures to mitigate the troublesome effects of time-variant path fading, such as suitable fade margins and antenna diversity.

In the paging and radio communication fields, various systems of sequencing and simulcasting have been proposed to achieve some increased coverage. Examples of typical proposed systems are illustrated in FIG. 2 and 3. The related systems are described in U.S. Pat. Nos. 3,836,726, issued September 1974 and 5,038,403 issued Aug. 6, 1991. FIG. 2 illustrates a system utilizing sequencing while FIG. 3 illustrates a system utilizing simulcasting. As can be seen, the aim is to cover maximum area with minimum area of signal overlap. Even if someone suggested application to UHF Wireless Cable type communications, such propagation fields would still exhibit the above noted problems due to obstructions, multi-path interference and fading.

Clearly a need exists for a broadcast system providing increased propagation coverage and reduced areas of blockages. Any such system should also provide an increased number of programs, without requiring additional spectrum allocation. The system should provide good signal quality throughout the entire reception area or service area. Accordingly, it is also desirable to minimize multipath interference and loss of service due to fading.

An additional set of problems arise in providing the wireless cable service to certain types of multiple living unit residences. Many planned development communities have restrictive covenants which run with ownership of the property. In such communities, whether the homes are town houses or single family homes, the covenants may prevent installation of visible outside receiving antennae. Also, only a few homes in the community may have a good location for a line of sight receiving antenna. In apartment complexes, the residents may not be able to locate a dish type antenna outside at all, or if allowed to have such an outside antenna, they may not have access to a point on the building from which to aim the antenna at the transmitter tower.

Clearly an additional need exists for cost effective systems for supplying wireless cable broadcast signals to multiple living unit installations.

DISCLOSURE OF THE INVENTION

The present invention provides methods and apparatus to address the above stated needs. The present invention contemplates an RF frequency simulcasting method for transmitting information from multiple spaced transmitting sites to multiple receiving sites in a reception area. A signal including multiplexed channels is transmitted simultaneously from a plurality of spaced transmitting sites. The transmitting sites propagate the signal into substantially overlapping regions of at least a major portion or the intended reception area. At the subscriber premises, a terminal device receives a signal containing a plurality of time delayed copies of the transmitted signal. At least a portion of the received signal is processed to acquire a single copy of a signal corresponding to a selected one of the multiplexed channels, and information contained in the acquired signal is presented, e.g. in a form that is sensorially perceptible to a user. In the preferred embodiments, the processing of multiple copies utilizes a delay equalization technique.

The overlapping transmission or propagation areas reduce or eliminate blockage zones and effects of fading. This technique also limits the number of receivers effected by equipment outages. Typically, a directional receiving antenna can be aimed toward at least one strong line-of-sight transmission source.

To increase the number of programs broadcast by a system operating in accord with the above simulcasting method, each of the multiplexed channels carries a multiplexed stream of digital data representing a plurality of programs. The programs may be audio or data, but in the currently preferred embodiment, the programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

In an exemplary implementation of the present invention, real-time encoders receive video programs and encode the information for those programs into packets of compressed digital data, e.g. in accord with a recognized video compression standard. The headend may also receive previously encoded video program material from other sources, such as a digital server or a digital transmission media. Multiplexers combine digital data for groups of programs into the multiplexed packet data streams. A digital modulator, such as a 64 or 256 QAM modulator, modulates each digitally multiplexed packet data stream for transport in one unique RF channel. A combined spectrum signal containing the RF channels is upconverted to place the channels into available frequency channels in the UHF range.

The combined spectrum signal is supplied to a plurality of microwave broadcast transmitters located at spaced apart sites about the service area or reception region. Appropriate delays are imposed in one or more of the lines to the transmitters so that the transmissions from all the transmitter antennae occur simultaneously and in phase with each other.

At the receiver site, an antenna receives a signal from at least one of the transmitters. Preferably, the antenna is a directional antenna aimed at one of the transmitters for line-of-sight reception therefrom. The signal from the receiving antenna is downconverted and supplied to a wireless signal processor. The wireless signal processor, typically part of an interface module connected by a cable to the downconverter, processes the received wireless signal to select one of the channels. The wireless signal processor effectively acquires a digital multiplexed data stream from the selected channel and supplies that data stream to a digital signal processor.

The digital signal processor selects packets of data relating to a selected one of the programs. The digital processing section processes the compressed, digitized data from those packets to produce signals presentable to a user. In the preferred embodiment, the digital signal processor produces signals to drive a standard television set.

In a further aspect, the present invention relates to a shared receiving system for processing the multiplexed channel signals broadcast from the separate transmitter sites and supplying an optimal representation of the multiplexed channels to terminals in living units served by the shared receiving system. The shared receiving system typically serves homes in a specific community, a town house development, an apartment or hotel building, or the like.

The shared receiving system includes at least two directional receiving antennae. Each directional receiving antenna is directed to receive a signal including the multiplexed channels from a different one of the transmitters. This effectively provides an angular diversity in reception. A shared signal processing circuit receives a signal from each of the receiving antennae, and in response thereto, outputs a single optimized representation of the signal simulcast from the transmitters. A distribution system then broadcasts the single optimized representation from the shared processing circuitry to terminals located in a plurality of the living units. Each terminal receives the single optimized representation via the distribution system and processes a selected one of the multiplexed channels to present program information from the selected channel.

Preferred embodiments of the shared processing circuitry are described in detail below. To summarize briefly, one type of shared circuitry selects one antenna signal, including all the channels, based on the signal levels of the signals provided by the receiving antennae. Another type of shared circuitry processes each individual channel separately to select a strong channel signal from one of the antennae. The selected individual channel signals are then combined to form the optimized representation of the signal containing all of the multiplexed channels.

Preferred embodiments of the distribution system are also described in detail below. In one exemplary embodiment, the distribution system comprises a coaxial cable network, e.g. similar to a master antenna cable system. In this embodiment, the shared receiving system also includes an antenna for receiving off-the-air program signals, and the shared processing circuitry includes a combiner for merging the off-the-air program signals with the multiplexed signals carrying the digital transport streams. Another disclosed embodiment broadcasts wireless signals from the shared processing circuitry to the terminals served by the shared receiving system.

The shared receiving system should reduce objections under various restrictive covenants in multi-unit type single family and town house developments. Also, the shared system provides a convenient technique for supplying the simulcast programming to multi-unit dwellings or communities.

The angular diversity provided by use of multiple directional receiving antennae reduces the impact of fading. In many instances, atmospheric conditions causing fading will not effect the reception from all of the transmitters in the same way at the same time. As a result, it will be possible to still select and output a signal containing all of the multiplexed channels at an effective power level from the shared processing circuitry to the terminals served by the shared receiving system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

In accord with the present invention, groups of program signals are digitally encoded and compressed, and the compressed program streams are time division multiplexed into digital transport streams. Each digital transport stream is modulated and/or upconverted into one RF channel, in the preferred embodiment a channel in the high end of the ultra high frequency (UHF) microwave range (e.g. 2.1 to 2.7 GHz), although other frequency channels could be used. Separately located transmitters simultaneously broadcast a UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 4:
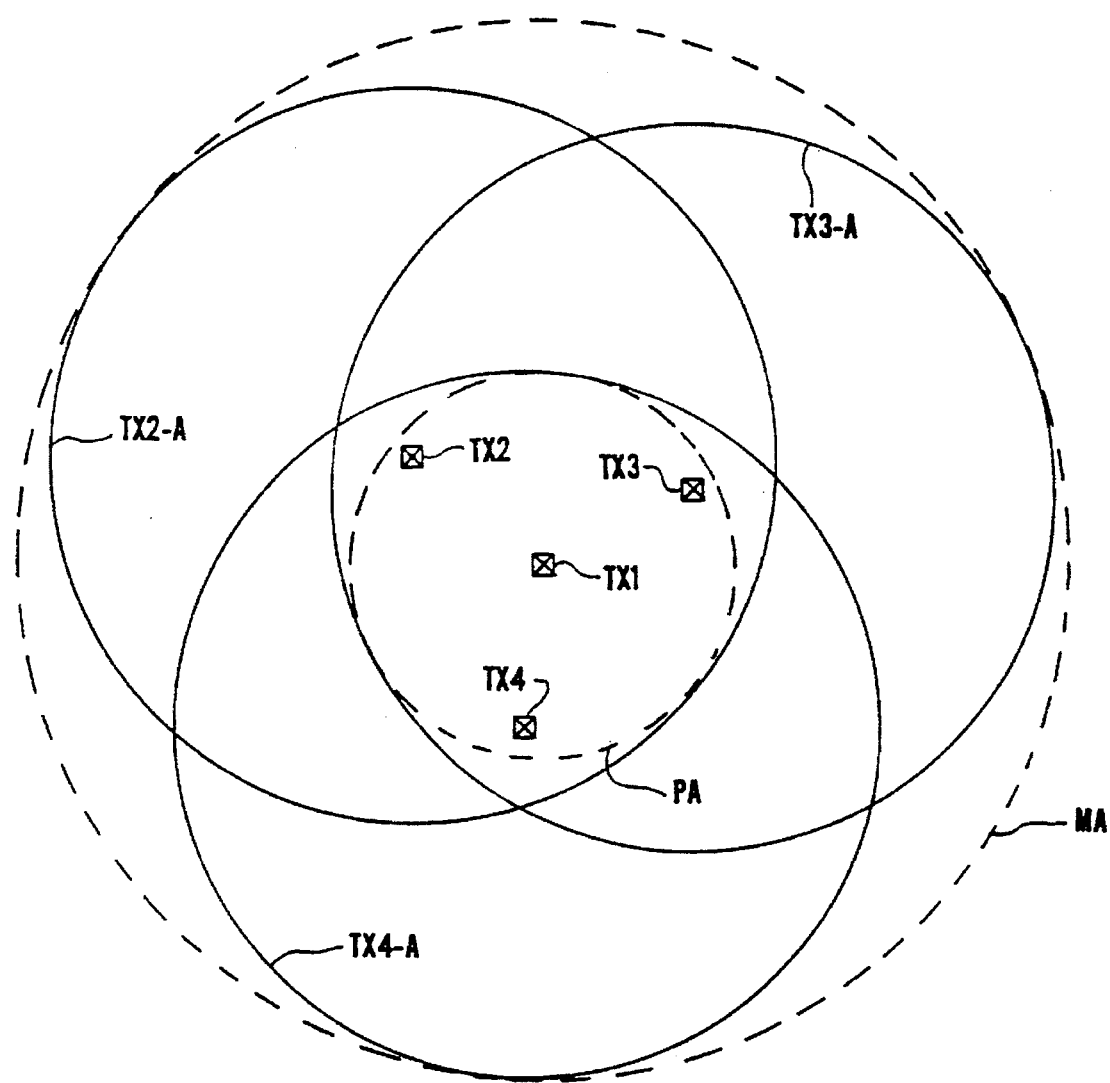
FIGS. 4 and 5 depict exemplary propagation areas for simulcast transmissions into a receiving area, in accord with the present invention.

Referring to FIG. 4, the circle PA defines the Protected Area or primary area which may be serviced from a transmitting antenna TX1. At the present the radius of this circle is 15 miles. However, usable signal and acceptable reception generally occurs to a radius of 40 miles which is here defined by the circle MA indicating the Maximum Area. The region between the 15 mile radius and the 40 mile radius forms a 'secondary' service area. According to the invention, all or part of the rights of the educational institution for ITFS service are leased. Also, licenses are aggregated, from companies currently licensed to use MMDS channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Figure 1:
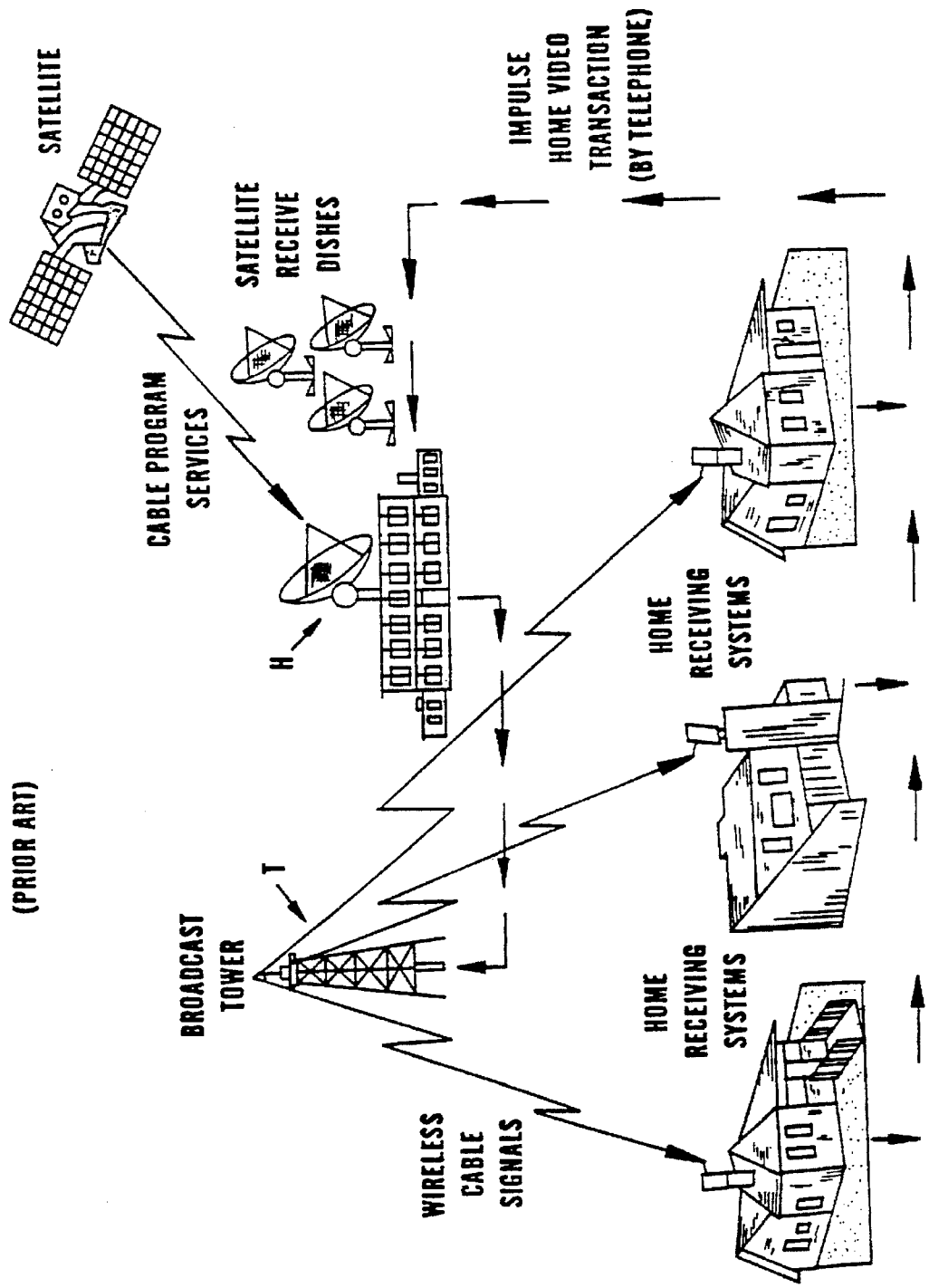
FIG. 1 is a simplified diagram of a prior art wireless cable television system.
Figure 1A:
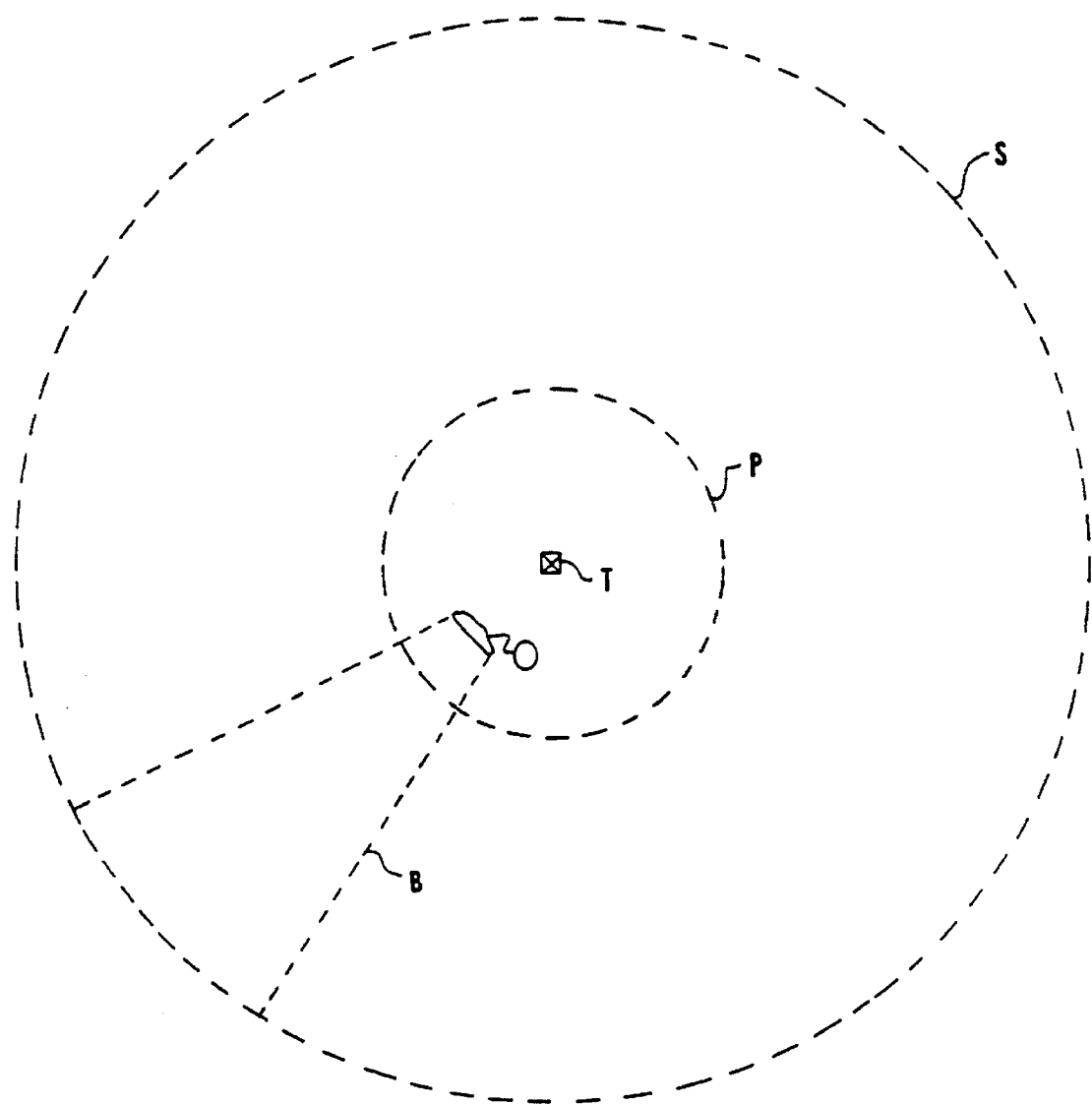
FIG. 1A shows service areas relating to a single wireless transmitter in the system of FIG. 1.

Referring to FIG. 4 there is shown one preferred embodiment of a simulcast arrangement utilizing the original antenna TX1 in addition to antennas TX2, TX3 and TX4 disposed in a generally triangular configuration within or on the boundary of the Protected Area (PA). According to this embodiment of the invention, all antennas radiate in an omni-directional pattern in azimuth as indicated by the circles TX2-A, TX3-A and TX4-A. The central antenna TX1 radiates out to the maximum area MA, in a manner permitted by existing regulations, as discussed above relative to FIG. 1A. A major portion of the protected area (PA) is overlapped by the signals from all antennas TX1, TX2, TX3 and TX4. In the Maximum Area (MA) considerable overlap continues to exist but to a lesser extent. In this manner it has been found possible to reach receivers in approximately 90–95% of the maximum area (MA).

Figure 2:
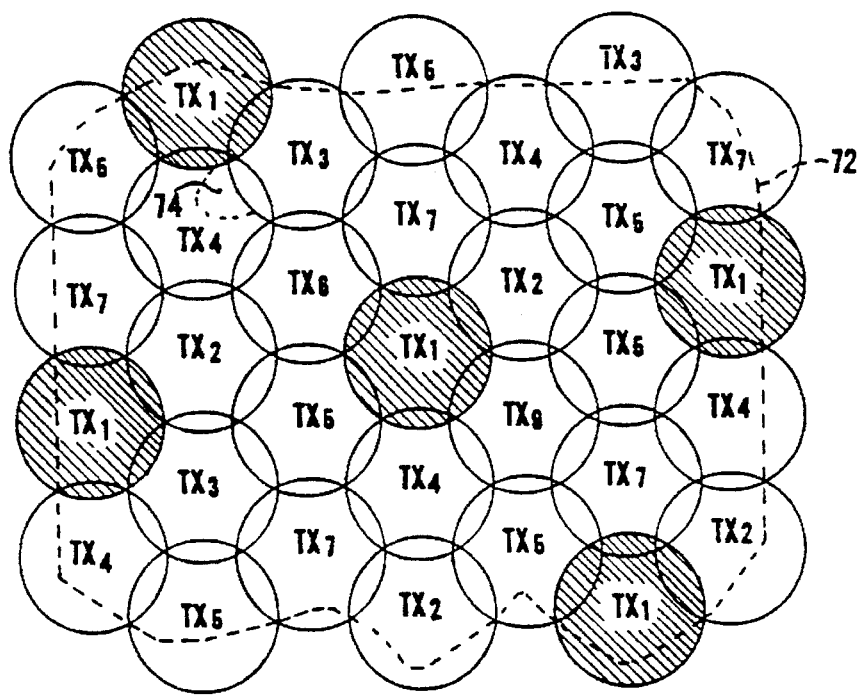
FIGS. 2 and 3 show propagation areas for multi-transmitter systems used in other types of prior art systems, e.g. paging.
Figure 3:
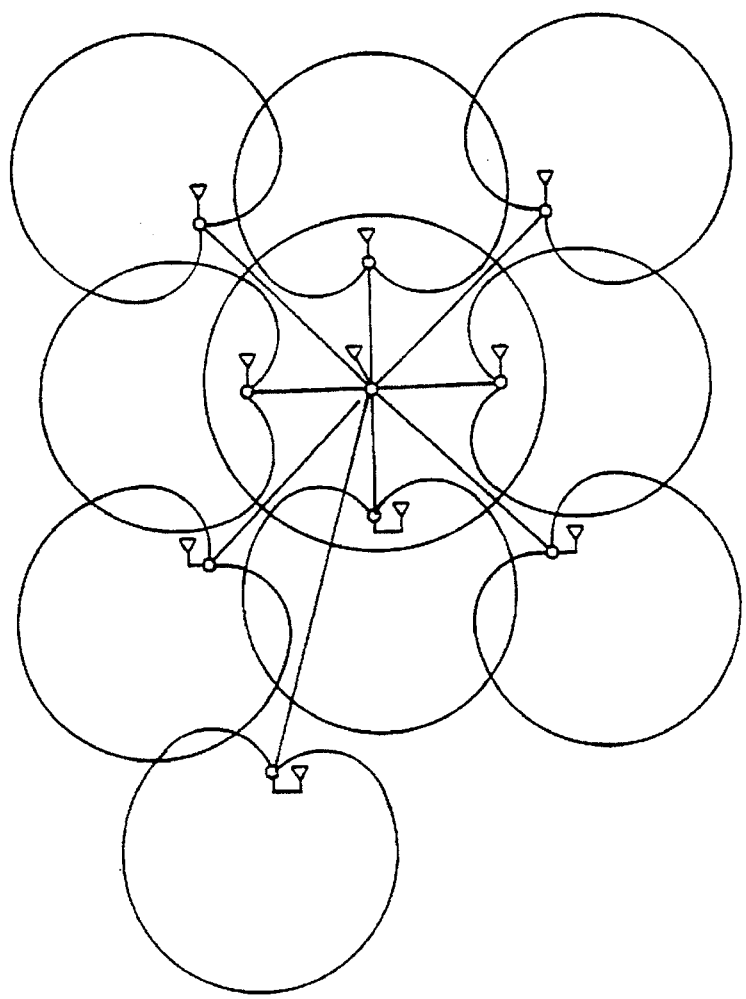
Figure 5:
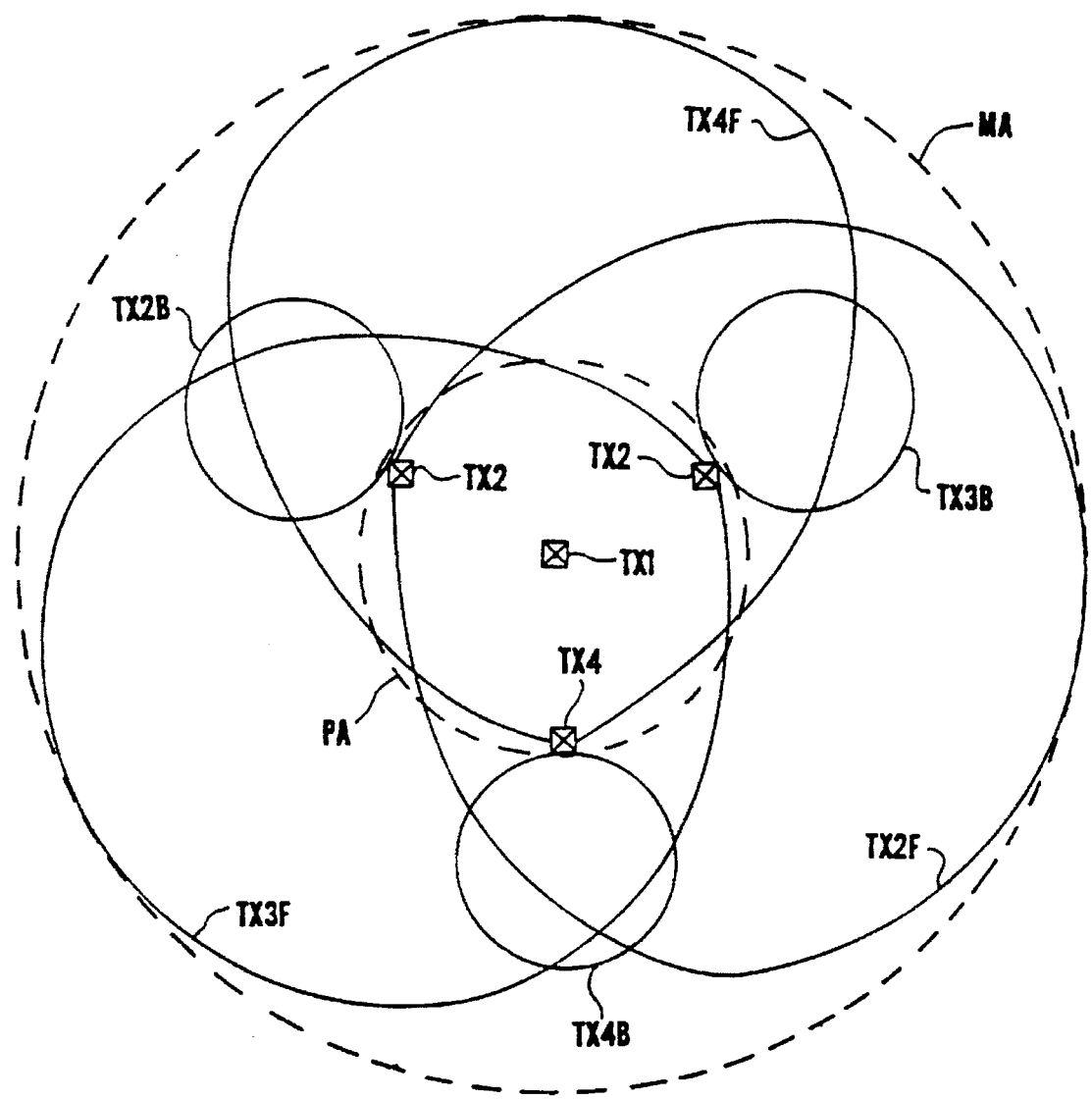

Referring to FIG. 5 there is shown a second preferred embodiment of simulcasting utilizing directional antennas TX2, TX3 and TX4. In this embodiment the central antenna TX1 retains its omni-directional pattern. However, the antennas TX2, TX3 and TX4 are provided as directional antennas radiating forward and backward lobes TX2F and TX2B for antenna TX2, TX3F and TX3B for the TX3 antenna and TX4F and TX4B for the TX4 antenna. In both the embodiments of FIGS. 4 and 5 it will be seen that there is a radical departure from the minimum overlap approach which is conventional in the systems illustrated in FIGS. 2 and 3.

The simulcast transmission from the broadcast antennae include a plurality of frequency multiplexed channels. Each channel contains a digital transport stream carrying a number of programs, in compressed digital form. The programs may be audio only programs, or data, but in the preferred embodiments, the programs are television type programs. The television type programs contain video and audio information, and may include data information, e.g. for closed captioning and the like. The system and method for transmitting the simulcast signals and receiving those signals within the service area are now briefly described.

Figure 6:
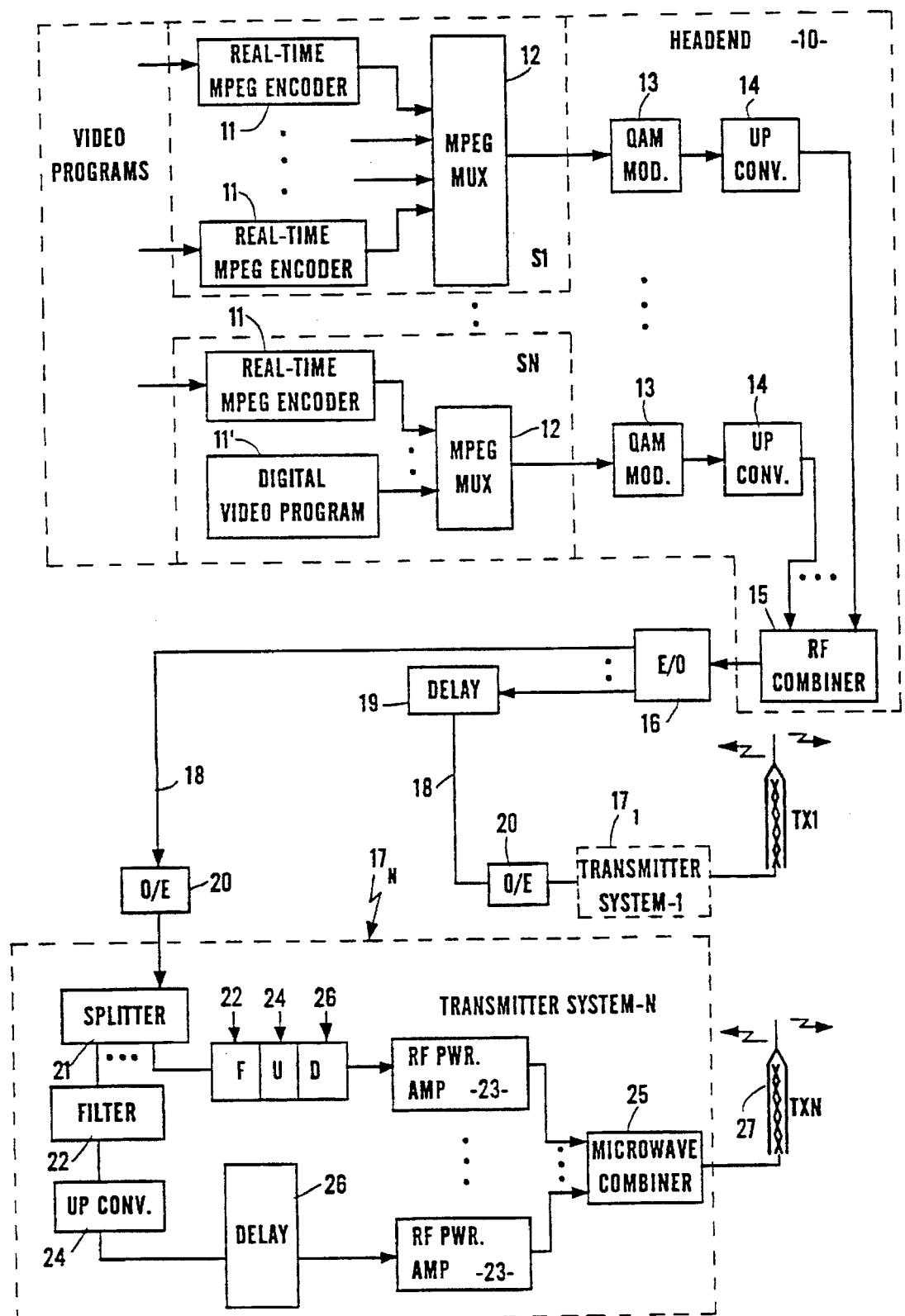
FIG. 6 depicts in functional block diagram form the elements of the transmission system used in accord with the present invention.

With reference to FIG. 6, the broadcasting portion of the system includes a headend 10. The headend includes a number of Sources S1 to SX for producing digital transport streams, each of which contains a plurality of programs encoded as digital, compressed data. The number of such sources corresponds to the number of frequency channels available for use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. The headend 10 therefore typically comprises 20–25 of the Sources S1 to SX, but may include as many as 33 such sources. The Sources S1 to SX may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding. FIG. 6 illustrates the overall architecture of the broadcasting system. As part of the headend 10, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into 4000 transport packets.

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in only 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG II standard facilitates time division multiplexing of MPEG packets from a plurality of programs. In the present system, the encoders 11 supply MPEG packets streams for multiple programs to an MPEG multiplexer 12. The number of programs may vary depending on the bandwidth. The MPEG multiplexer 12 may receive digitized and compressed (MPEG) video from other sources 11'. Typical digital sources 11' include digital server (storage) systems and digital video transmission systems (e.g. satellite or optical fiber).

As discussed below, a typical multiplexed digital transport packet stream used in the present invention has 27 Mbits/s of capacity. A mixture of program streams for individual programs at different individual rates, e.g. 1.5 Mbits/s, 3 Mbits/s and 6 Mbits/s, may be combined to fully utilize the 27 Mbits/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel. The other mix of three 6 Mbits/s programs and three 3 Mbits/s programs provides six programs for one RF channel, i.e. a 6 to 1 improvement. Lower bit rates and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source.

In a combined MPEG packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the steam with dummy packets to reach the full 27 Mbits/s). The actual stream will include an additional 3 Mbits/s of forward error correction information for a combined rate of 30 Mbits/s, although hereinafter for convenience the bit stream is generally described by its 27 Mbits/s payload rate. The MPEG II standard also requires that a packet stream containing packets relating to one or more programs includes a program association table in a packet identified by PID 0. The program association table maps each program number with the PID value associated with the program map related to that source. In accord with the standard, each MPEG II multiplexer 12 combines MPEG packet streams for the four (or more) input programs and adds a PID 0 packet containing the program association table to the combined stream. In the above example, the program association table would map program number '1' (HBO) with PID value 132 indicating that the program map for HBO is contained in repeating packets identified by PID 132. Similarly, the program association table would map program number '2' (Showtime) with PID value 87 indicating that the program map for Showtime is contained in repeating packets identified by PID 87.

As discussed in more detail below, reception of a particular digital program requires that the CPE terminal device know the RF channel transporting the program and the program number (PN) associated with the program. The decoder uses the information contained in the PID 0 packet to identify the PID value for the program map for the particular desired program, e.g. 132 in the above HBO example, and uses the program map to identify the PID values needed to capture the video, audio and user data (if any) for the desired program.

The 27 Mbits/s (payload) baseband digital output of each MPEG multiplexer 12 from one of the sources S1 to SX goes to a modulator 13. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a cable television type distribution network. The currently preferred implementation uses 64 QAM (quadrature amplitude modulation) or 16 VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s can be modulated into one 6 Mhz bandwidth analog channel. Similarly, 256 QAM or 16 VSB would yield up to 40 Mbits/s payload of capacity (not counting bits added for forward error correction), e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter converts the frequency of the QAM modulated signal up to one of up to thirty-three RF channel frequencies in the 50–450 Mhz range. The upconverter 14 may be an element of the QAM modulator 13 or a separate element as shown hard wired to process the output of the QAM modulator. Each upconverter 14 outputs a different 6 MHz bandwidth RF channel to an RF combiner 15 for combining with the other 6 MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems.

A transmission network supplies the combined spectrum signal in the UHF range from the combiner 15 to a number of transmitter systems $17_1$ to $17_n$. The transmitter systems $17_1$ to $17_n$ correspond to the transmitters TX1 to TX4 described above with respect to FIGS. 4 and 5. Although coaxial cable, wireless microwave relay transmissions or other media could be used, in the preferred embodiment, the transmissions from the headend 10 ride on optical fiber lines 18. In the preferred embodiment, an electrical to optical converter system 16 converts the signal from combiner 15 into optical signals for transmission over a plurality of optical fibers 18. An optical to electrical unit 20 at each transmitter site converts the optical signal back to the combined electrical signal and supplies that signal to one of the transmitter systems.

An important feature of the present invention relates to simulcasting, i.e. simultaneous broadcasting, of the combined spectrum UHF signal from a plurality of and possibly all of the transmitter towers TX1 to TXN. The optical fiber signal transmission from the headend 10 to the transmitter systems requires some finite amount of time. Typically, the transmitter systems will not be equi-distant from the headend. In fact, one of the transmitter systems may be in the same building as the headend. To insure simultaneous broadcasting, the system shown in FIG. 6 therefore includes some form of delay 19 in one or more of the transport lines 18. The delay may take the form of coils of fiber to equalize the optical transport paths and therefore the time through each path. Alternatively, one or more electronic delay devices may be imposed in the relevant paths, either at the headend prior to optical transport or at the respective transmitter location subsequent to conversion back to electrical signal form.

There may be as few as two transmitters. In a typical example, there will be a central transmitter site TX1 and two or three other transmitter sites TX2, TX3 and TX4 at various locations about the primary reception area (see e.g. FIGS. 4 and 5). The headend may be close to the central transmitter site TX1, therefore the transport distance to that site would be the shortest. Assume now, for example, that TX4 is the longest distance from the headend. The delay produced by delay device 19 will be equal to the difference in the time required to transport optical signals from the headend to those two sites, i.e. so as to result in simultaneous in-phase transmission of the exact same signal from the antennae at the two transmitters TX1 and TX4. Similar delays are imposed in the lines 18 to the other transmitter systems. Alternatively, at least two transmitters on the periphery may transmit substantially simultaneously, whereas one or more of the other transmitters (e.g. a central transmitter) may transmit a delayed broadcast of the signal.

FIG. 6 also shows details of one of the transmitter system 17N, by way of an example. Each transmitter system includes a splitter 21. The splitter 21 together with associated channel selection filters 22 divide the received combined signal (50–450 MHz) into its constituent 6 MHz wide RF channels. For each 6 MHz channel in the 50–450 MHz range, one of the upconverters 24 converts that channel into one of the up to thirty-three available (licensed) channels in the UHF microwave range. An RF power amplifier 23 amplifies each UHF channel.

A delay device may process each channel signal, and by way of example, FIG. 6 shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel.

A microwave combiner 25 combines the UHF channel signals back into a combined spectrum signal in the UHF range and supplies that signal to a microwave broadcasting antenna 27. Each transmitting antenna may be an omnidirectional antenna or a directional antenna. The type of antenna at each transmitter site is selected to give the optimum coverage in a particular geographic service area. The antenna 27 emits UHF waves to propagate through a portion of the service area. For each channel, the resultant broadcasts from all of the transmitters are synchronized and in phase with each other. The transmitted microwave signals propagate into substantially overlapping portions of the service area and into some non-overlapping portions of that area, for example in patterns such as shown in FIGS. 4 and 5.

The above discussion of the headend and transmission systems is one example of an overall system for providing the simultaneous, synchronized, in-phase broadcasts from multiple transmitters having substantially overlapping propagation areas. Other headend and transmitter systems could be used. For example, the headend 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to synchronize processing and broadcast transmissions to some common clock, e.g. from a geo-positioning type satellite system, to achieve the simulcast transmission.

Figure 7:
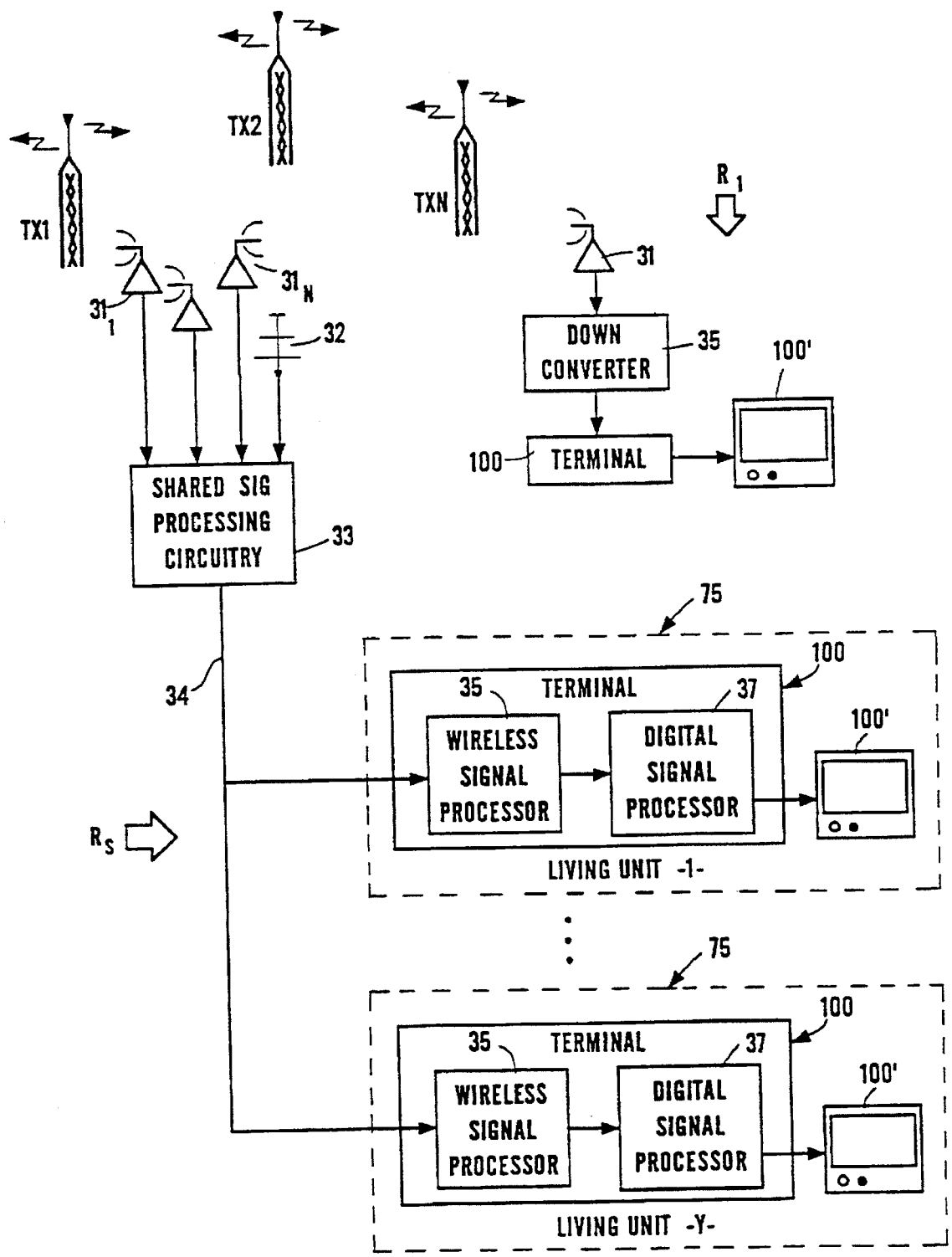
FIG. 7 illustrates the high-level functional elements of a customer premises receiver system and one embodiment of a shared antenna and signal processing system used in accord with the present invention.

FIG. 7 provides a high-level functional diagram of the receiving systems used in the present invention.

In accord with a further aspect of the invention, a group of users or locations will have a shared receiving system $R_s$. This receiving system includes a plurality of directional microwave antennae. There may be as few as two such receiving antennae aimed at visible ones of the transmitters TX1 to TXN, but preferably the system includes the same number of microwave receiving antennae $31_1$ to $31_N$ as there are transmitters TX1 to TXN serving the region. In such a preferred system one of the microwave receiving antennae $31_1$ to $31_N$ is aimed at each of the transmitters TX1 to TXN. This arrangement provides angular diversity in the broadcast waves received through these antennae. Because of the shared use by multiple customers, the size, gain and quality of these antennae can be relatively high. Also, since there is only one set of antennae, presumably, the antennae can be placed at one or more sights on community property or on the top of the apartment building were the group of customers reside.

The microwave receiving antennae $31_1$ to $31_N$ may be mounted on a relatively high mast to provide clear line-of-sight reception from all of the transmitters serving the region. Alternatively, the antennae $31_1$ to $31_N$ may be located at different vantage points around the development. In a single family home community or in a town house development for example, each individual microwave antenna could be located on a different home, as agreed by the home owners, so as to provide line-of sight reception from the desired one of the transmitters TX1 to TXN. For example, one home at one end of the development may have a clear line-of-sight to one transmitter tower, a second home at the other end of the development may have a clear line-of-sight of the second transmitter, etc. Antennae located on those homes are connected to the shared processing circuitry 33. On an apartment or hotel building, each individual antenna could be located at a different one of the corners of the building, so as to provide the necessary line-of sight reception from the desired one of the transmitters TX1 to TXN.

The shared receiving system $R_s$ also includes a television antenna 32 for reception of standard off-the-air transmissions in the normal VHF and UHF television channel frequencies. Signals from the microwave receiving antennae $31_1$ to $31_N$ and the television antenna 32 all go to shared signal processing circuitry 33. The shared signal processing circuitry 33 processes the signals from the microwave receiving antennae $31_1$ to $31_N$ to produce a single high quality RF spectrum signal in at least a portion of the 50–450 MHz range from the microwave transmissions. The shared signal processing circuitry 33 combines that signal with off-the-air analog video channel signals from the antenna 32.

The channels received by microwave transmission may be interleaved into RF channels having no corresponding off-the-air transmissions. For example, in an area having off-the air transmissions on channels 5, 7 and 9 the circuitry 33 would place some of the microwave transmitted channel information into channels 6, 8 and 10. Alternatively, the off-the-air channels may simply occupy the lower portion of the output bandwidth, e.g. 50–225 MHz, then the shared signal processing circuitry 33 places the microwave transmitted channel information into channels in the 225–450 MHz range and combines the signals together. Exemplary systems for use as the shared signal processing circuitry 33 are discussed below with regard to FIGS. 7A and 7B.

The shared signal processing circuitry 33 outputs the processed channel signals through a distribution network to some number Y of individual living units 75. A variety of distribution networks may be used, including a wireless system discussed later with regard to FIG. 10, 10A and 10B. In the example shown in FIG. 7, the distribution network takes the form of a wired system, preferably a coaxial cable network. Although not shown, the coaxial cable network would include amplifiers and splitters, as necessary, to supply the signals from the shared processing circuitry 33 to however many of the living units the shared system $R_s$ services, in a manner essentially identical to that of a master antenna cable system utilized today in an apartment or hotel.

The distribution network 34 supplies the 50–450 MHz combined spectrum signal to one or more terminal devices 100 located at various places in each subscriber's living unit 75. Each terminal 100 includes some form of wireless signal processor 35 and a digital signal processor 37. The wireless signal processor 35 processes a selected one of the 6 MHz channels to recover the digitally multiplexed transport stream carried in that channel. Each terminal connects to an associated television set 100'. The digital signal processor 37 processes data packets for the selected program from the multiplexed stream to produce signals to drive the TV 100'. The TV 100' presents the program to the viewer in sensorially perceptible form, in this case, as a standard audio/visual output. The television set 100' may also selectively tune off-the-air television channels.

The simulcast transmissions in accord with the present invention will also service customers not associated with a shared receiving system, such as the system Rs. Such other customers will have their own receiving system $R_1$. For example, if such a customer is a home owner, that customer's system $R_1$ would include a small dish type directional antenna 31, a block downconverter 35 and a coaxial distribution system connected to one or more terminals 100 (only one shown).

Typically the antenna 31 is an elliptical dish shaped antenna 18 inches or less in diameter, formed of parallel curved elements. The dish 31 is aimed at the one transmitter TX1 to TXN which produces the strongest received signal through the antenna at the subscriber's particular location. The receiving antenna 31 supplies the 2.1 to 2.7 GHz spectrum (through appropriate filtering and/or amplifiers not shown) to the block down-converter 35.

The block downconverter 35 converts the 2.1 to 2.7 GHz signal, containing all of the RF channels, back down to the video channel band of 50–450 MHz. The block downconverter supplies the 50–450 MHz combined spectrum signal via a coaxial cable to one or more terminal devices 100 located at various places in the subscriber's home. The terminal 100 in the residential system $R_1$ typically is identical to that used in the shared reception system $R_s$. The single residence system may have only one terminal, but in many instances, the signals will be distributed to up to four terminals located throughout the home at desirable television viewing locations.

In the single residence system $R_1$, as in the shared system $R_s$, the terminal 100 includes some form of wireless signal processor and a digital signal processor. The wireless signal processor processes a selected one of the 6 MHz channels to recover the digitally multiplexed transport stream carried in that channel. The digital signal processor 37 processes data packets for the selected program from the multiplexed stream to produce signals to drive the TV 100'. The TV 100' presents the program to the viewer in sensorially perceptible form, again as a standard audio/visual output.

In each of the receiving systems, each antenna is aimed at one of the transmitters TX1 to TXN. Even so, the antenna receives multiple copies of the transmitted waveform signals. These multiple copies or replicas include a primary direct line-of-sight transmission of a signal from the transmitter the antenna is directed towards together with delayed copies (typically delayed and distorted) caused by reflections of the transmissions from one or more of the multiple broadcast sites. Also, at locations in the secondary reception area, the direction of reception by the antenna may actually be substantially in line with two of the transmitters. In such a case, the antenna would receive a first copy of the combined spectrum transmission from the closest transmitter followed by a delayed copy transmitted from the more distant of the two aligned transmitters.

The present invention therefore contemplates inclusion of some form of delay processing in the receiver to compensate for the reception of multiple delayed copies of the transmitted program signals. The presently preferred embodiment discussed below utilizes a delay equalizer as described in commonly filed U.S. patent application Ser. No. 08/405,558, filed Mar. 16, 1995 (attorney docket no. 680-130) entitled "Simultaneous Overlapping Broadcasting of Digital Programs." As an alternative, the processing circuitry could utilize spread spectrum technology, as discussed in more detail in commonly assigned U.S. Patent application Ser. No. 08/405,685, filed Mar. 17, 1995 entitled "Television Distribution System and Method," the disclosure of which is incorporated herein in its entirety by reference.

Figure 7A:
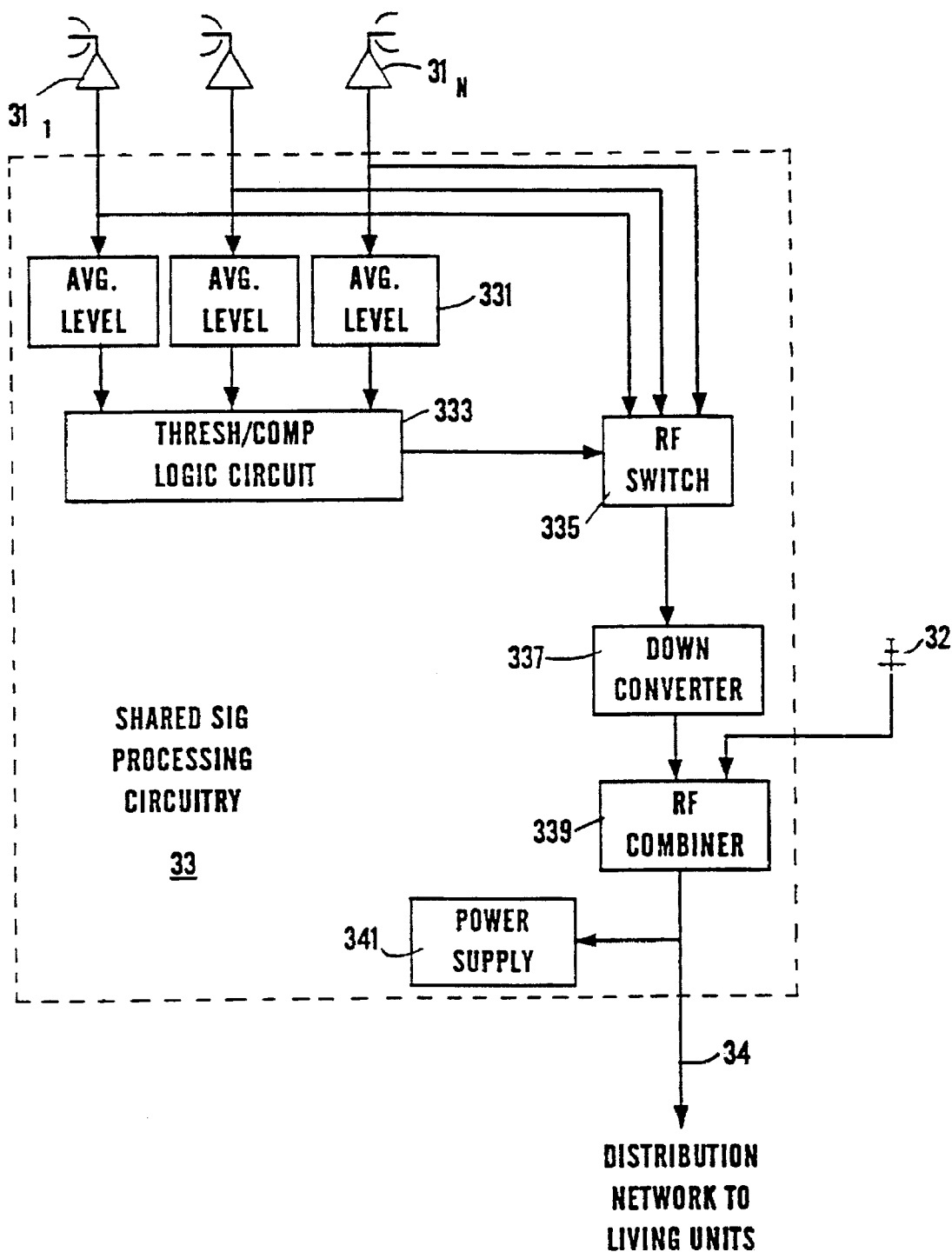
FIGS. 7A and 7B are more detailed functional diagrams of two examples of shared signal processing circuitry used in the shared receiving system illustrated in FIG. 7.

FIG. 7A shows a first example of the shared signal processing circuitry for use in the shared reception system $R_s$ depicted in FIG. 7. The circuitry 33 includes an average level detecting circuit 331 for processing the output of each of the microwave receiving antenna $31_1$ to $31_N$. The average level detecting circuits 331 produce output signals indicating the level of signal power in the 2.1 to 2.7 GHz range output from the respective antennae. As such, each signal represents the strength of the signal that the respective antenna is currently receiving.

The outputs of the average level detecting circuits 331 go to a threshold detector, comparator and logic circuit 333. The threshold detector, comparator and logic circuit 333 controls an RF switch 335. The RF switch 335 receives the output of each of the microwave receiving antenna $31_1$ to $31_N$. In response to a control signal from the circuit 333, the RF switch outputs a selected one of the signals from the microwave receiving antenna $31_1$ to $31_N$.

The circuit 333 may be constructed of discrete components, including threshold detectors, comparators and appropriate logic gates. Alternatively, the circuit 33 may include digital to analog converters and an appropriately programmed microprocessor.

The logic of circuit 333 will select a strong one of the antenna signals, i.e. above the threshold, and will not change this selection unless and until the selected signal falls below the threshold. However, if the previously selected microwave antenna signal falls below the threshold, e.g. due to fading caused by atmospheric conditions such as rain, then the circuit 333 will compare and select from among the signals from the other microwave receiving antennae. Specifically, the circuit will identify the strongest signal which is above the threshold. Again, the circuit 333 will maintain this selection until the selected signal falls below the threshold.

The RF switch outputs the selected one of the signals from the microwave receiving antenna $31_1$ to $31_N$ to a block downconverter 337. The downconverter 337 converts the 2.1 to 2.7 GHz signal, containing all of the microwave digital transport channels, back down to the video channel band of 50–450 MHz. The block downconverter supplies the 50–450 MHz combined spectrum signal to an RF combiner 339. The RF combiner 339 also receives the off-the-air channel signals from the antenna 32. The combiner combines channel signals from the combined spectrum signal output by downconverter 337 with channel signals from antenna 32, in one of the ways discussed above with regard to FIG. 7, and supplies the combined signal through the coaxial cable distribution network 34 to the terminal devices in the various living units.

The shared signal processing circuitry 33 may receive power via the coaxial cable distribution network 34. In such a case, the circuitry 33 includes a power supply 341 connected to the cable network 34. The power supply 341 provides all necessary power to the operating elements within the shared signal processing circuitry 33. The power supply 341 is essentially the same as supplies used in cable television systems.

Figure 7B:
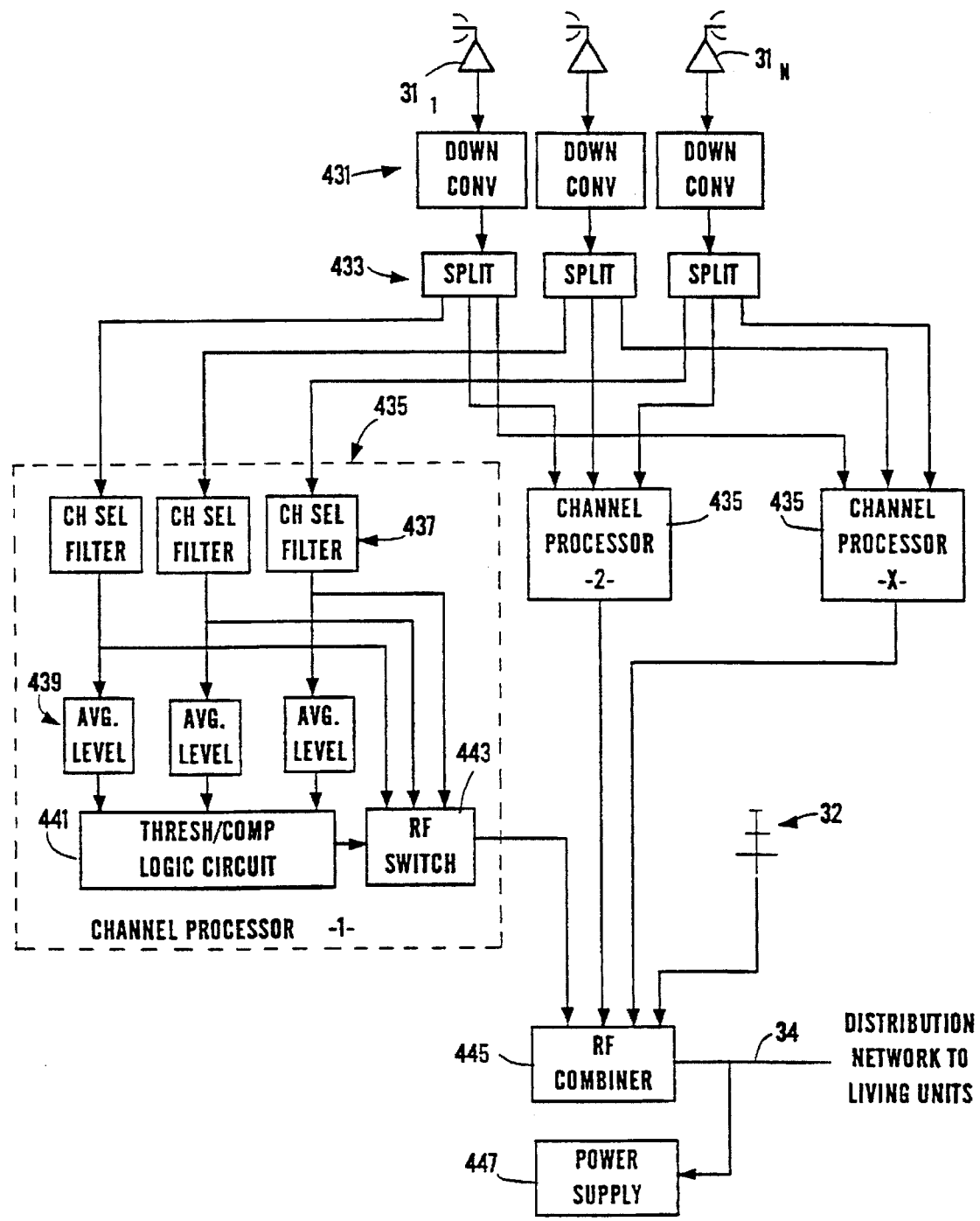

FIG. 7B shows a second example of the shared signal processing circuitry for use in the shared reception system $R_s$, depicted in FIG. 7. In this embodiment, shared circuitry includes a block downconverter 431 connected to each of the receiving antennae $31_1$ to $31_N$. Each downconverter 431 converts the 2.1 to 2.7 GHz signal, containing all of the microwave digital transport channels, back down to the video channel band of 50–450 MHz. Each block downconverter 431 supplies the 50–450 MHz combined spectrum signal from one of the antennae $31_1$ to $31_N$ to a splitter 433. Each splitter splits and amplifies the respective antenna signal as necessary to supply a copy thereof to each of a plurality (X) of channel processors 435.

There is one channel processor for each the RF channels carrying the digital multiplexed program streams. FIG. 7B shows the structure of a first channel processor -1- in block diagram form. As shown, the first channel processor -1- includes a bank of channel selection filters 437. Specifically, the bank includes one channel selection filter for each antenna signal. In the first channel processor -1-, the channel selection filters 437 all select a predetermined one of the 6 MHz channels in the 50–450 MHz range carrying a digital multiplexed transport stream. For example, the filters 437 might select a channel corresponding to TV channel 2.

Each of the channel selection filters 437 provides a single RF channel signal received through one of the microwave antennae $31_1$ to $31_N$ an average level detecting circuit 439. The function of the circuits 439 is similar to that of the average level detecting circuit 331 discussed above, except that the circuits 439 process the signal for only the one selected 6 MHz RF channel. Each average level detecting circuit 439 produces an output signal indicating the level of signal power of the selected channel as received by one of the antennae $31_1$ to $31_N$. As such, this signal represents the strength of the one downconverted channel signal, that the particular antenna is currently receiving from the respective transmitter.

The outputs of the average level detecting circuits 439 go to a threshold detector, comparator and logic circuit 441, which is similar to the circuit 331 discussed above. The threshold detector, comparator and logic circuit 333 controls a single channel RF switch 443. The RF switch 443 receives the single channel outputs of all of the channel selection filters 437 within the one channel processor 435. In response to a control signal from the circuit 333, the RF switch outputs a selected one of the single channel signals.

The logic of circuit 441 will select a strong one of the single channel signals received and downconverted from a respective one of the microwave receiving antennae $31_1$ to $31_N$, i.e. one that is above the threshold. The logic circuit 441 will not change this selection unless and until the selected signal falls below the threshold. However, if the previously selected channel signal falls below the threshold, e.g. due to fading caused by atmospheric conditions effecting the one channel, then the circuit 441 will compare and select from among the single channel signals from the other filters 437. Specifically, the circuit will identify the strongest signal for the particular channel which is above the threshold. Again, the circuit will maintain this selection until the selected channel signal falls below the threshold.

The single channel RF switch 443 outputs the selected one of the signals for the particular channel as received and downconverted from the selected microwave receiving antennae $31_1$ to $31_N$ to an RF combiner. The other channel processors 435 are identical in structure to the channel processor -1-, except that the filters in each processor selects a different one of the channels for processing. The RF combiner 445 receives the optimum signal for each channel as selected by the respective processor 435 and combines all of the optimum channel signals into a single combined spectrum output signal.

As in the earlier embodiment, the RF combiner 339 also receives the off-the-air channel signals from the antenna 32. The combiner combines channel signals from the antenna 32 into the combined spectrum signal in the 50–450 MHz range together with the selected RF channel signals output by channel processors 435, in one of the ways discussed above with regard to FIG. 7. The RF combiner 339 supplies the combined signal through the coaxial cable distribution network 34 to the terminal devices in the various living units.

The shared signal processing circuitry shown in FIG. 7B may receive power via the coaxial cable distribution network 34. In such a case, the circuitry includes a power supply 447 connected to the cable network 34 which operates in the same manner as the power supply 341 discussed above with regard to the embodiment of FIG. 7A.

Figure 8:
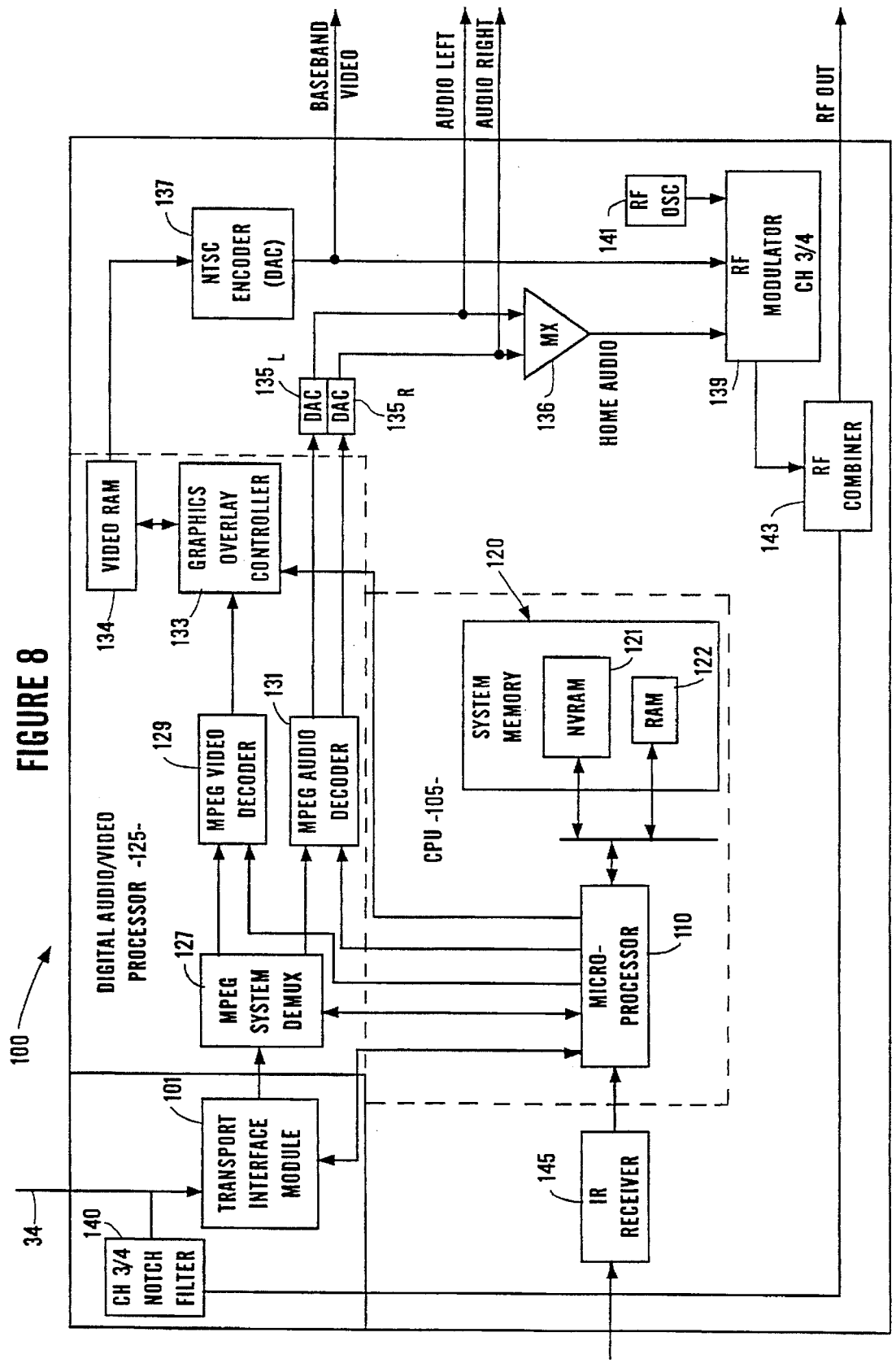
FIG. 8 illustrates in block diagram form the elements of one terminal device used in the system of FIG. 7.

FIG. 8 illustrates the functional elements of the terminal 100. In this embodiment the terminal 100 is a digital entertainment terminal, or 'DET.' The DET 100 will include a transport interface module (TIM) 101 providing the actual physical connection to the coaxial cable network in the subscriber's premises. The transport interface module (TIM) 101 will also perform the format conversion necessary between signal formats utilized by the network and signal formats used within the digital processing portion of the DET 100. In the present invention, the TIM performs RF tuning and QAM demodulation. If the programming is encrypted, the TIM also includes the necessary decryption circuitry. The TIM 101 therefore serves as the wireless signal processor 35. The main portion of the DET 100 serves as the digital signal processor 37.

In the illustrated embodiment, the transport interface module (TIM) 101 presents two connections to the rest of the DET, a high bit rate broadband connection for received broadband signals and a low bit rate signaling connection to permit control and monitoring of the TIM by a microprocessor within the main portion of the DET. For a selected channel, the TIM hands off the 27 Mbits/s baseband digital transport stream captured from that RF channel to the main portion of the DET. The structure of the TIM 101 is described in more detail below with regard to FIG. 9.

The DET 100 includes a CPU 105, comprising a 386, 486 or Pentium microprocessor 110 and associated system memory 120. The system memory 120 includes volatile dynamic RAM 122 and non-volatile RAM 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 134.

The MPEG system demultiplexer circuitry 127 recognizes packets in the MPEG data stream received over the broadband channel through the transport interface module (TIM) 101 and routes the packets having predetermined PID values to the appropriate components of the DET. For example, under CPU control, the MPEG system demultiplexer 127 circuitry recognizes audio and video packets in the MPEG data stream as audio and video relating to a selected program and routes those packets to the decoders 129, 131, respectively. The MPEG system demultiplexer circuitry 127 route packets having specified PID values identified as user data packets to the CPU 105 for further processing. The MPEG system demultiplexer circuitry 127 recognizes program map packets (and program association packets if necessary) and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 134 is not a specialized "video RAM" as that term is sometimes used in the television art. The RAM 134 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as information included as user data in the MPEG packet streams, in response to instructions from the CPU 105. The video RAM 134 sequentially receives each frame of digitized, uncompressed video information, as output from the MPEG video decoder 129. The video RAM 134 also receives digital information and read/write control signals from the graphics overlay controller 133 representing the several planes of text and graphics information and combines that information with the frames of decompressed video to produce composite video frames.

The graphics overlay controller 133 and the video RAM 134 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 134, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user. In the embodiment illustrated in FIG. 1, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on applications programming and/or operating system software stored in the system memory 120. For example, in response to certain input commands, the microprocessor 110 may control a cursor position and display received user data in the form of alphanumeric information displayed as graphics and text on the associated television set 100'. The microprocessor 110 will also respond to an appropriate input command from the user to select a broadcast program as discussed in more detail below.

Figure 9:
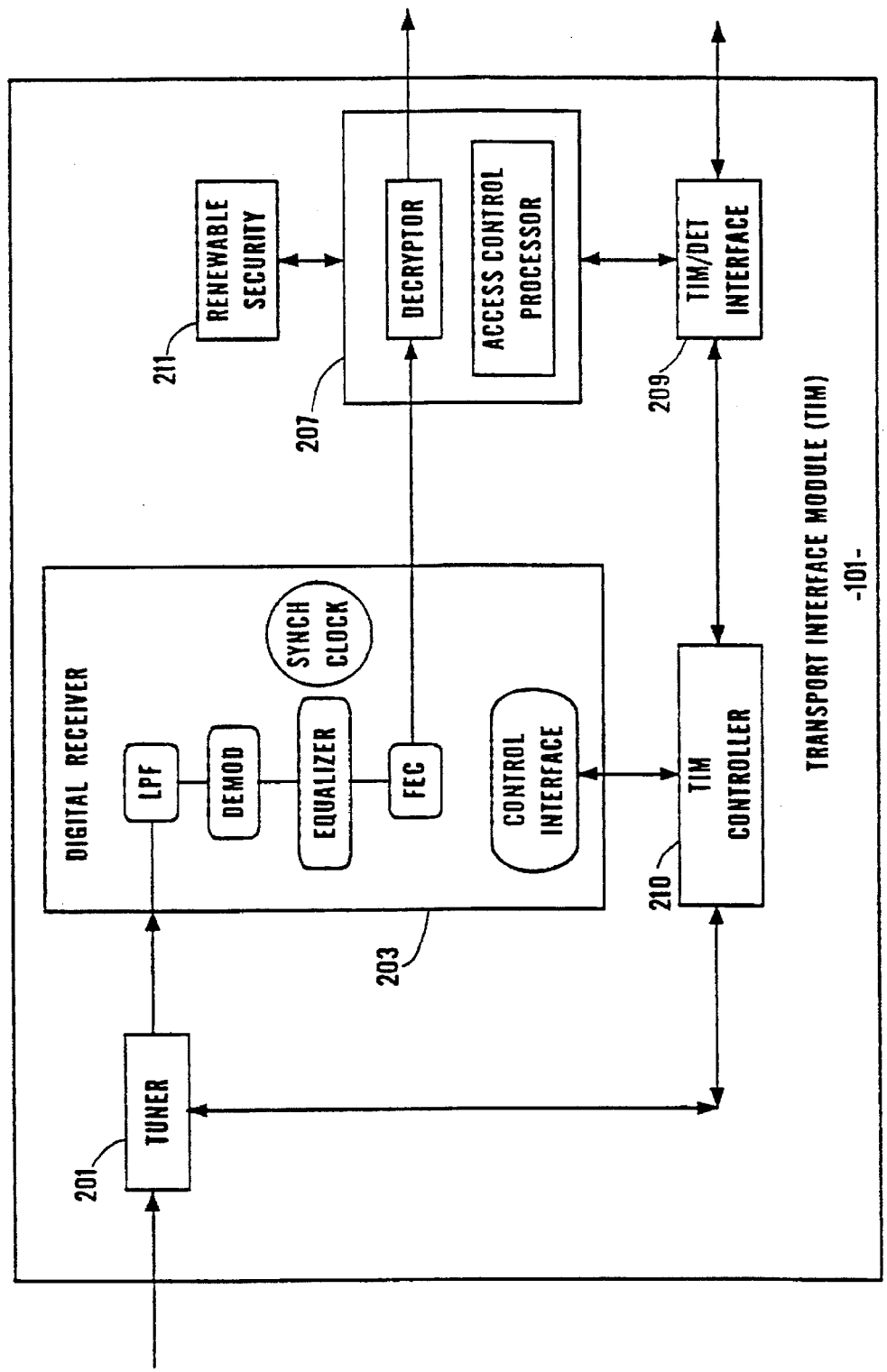
FIG. 9 is a block diagram illustration of the elements of a transport interface module used in the terminal of FIG. 8.

FIG. 9 depicts in block diagram form the structure of a TIM 101. The structure illustrated is based in part on the current preference for the 64 QAM modulation techniques for the digital video signals in transmission system of the type shown in FIG. 6. The input to the TIM is a broadband RF signal in the 50–450 MHz range provided from a coaxial cable from the down converter. The tuner 201 selects a specific 6 MHz channel from the broadband input spectrum and presents it at an intermediate frequency to the digital communications receiver section 203.

The digital receiver 203 includes a low-pass filter, a demodulator (e.g. 64 QAM), a time domain adaptive digital equalizer, and forward error correction circuitry. A clock circuit provides synchronization for the digital output of the demodulator, the adaptive digital equalizer, and the forward error correction circuitry.

The time domain adaptive digital equalizer receives the output of the QAM demodulator. Because of the overlapping transmissions from multiple transmitter sites and/or because of multi-path delays, i.e. reflections of signals transmitted from one or more broadcast sites, the output of the demodulator will not be a clean digital pulse stream. Instead, the signal will be a composite of time delayed copies of the transmitted digital information. The time domain adaptive equalizer includes a multi-tap digital delay line. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. The forward error correction circuit processes the recaptured symbols (e.g. 1s and 0s) to determine if each is in the proper position in the stream.

A control interface provides appropriate control signals to the elements of the digital receiver 207 in response to instructions from the transport interface module (TIM) controller 210. The digital receiver processes signals selected from one of the RF channels by operation of the tuner 210 to capture one of the digital transport streams (e.g. 27 Mbits/s payload assuming 64 QAM). The digital processor outputs the transport stream as a corrected serial baseband digital feed.

A decryption module 207 is optional. If included, this module controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. When properly authorized, the decryptor in module 207 decrypts payload data within packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 100' and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map stored in the system memory 120. The microprocessor 110 supplies a message containing the RF channel number and the program number (PN) to the TIM controller 210 via interface 209. In response to the RF channel number, the TIM controller 210 activates the tuner 201 to tune to the identified channel. If the program is encrypted, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the packets of the selected program. As a result, the TIM 216 passes digital signals from the RF channel through the interface to the MPEG system demultiplexer 129 in the main portion of the DET wherein at least the information for the selected program is now in unencrypted form.

The MPEG demultiplexer 127 supplies information from the PID 0 packet, i.e. the program association table to the CPU 105. The microprocessor 110 uses the program number (PN) from the channel map stored in system memory 120 to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129, 131 to begin MPEG decoding of the selected program for presentation to the user via the associated television set 100'.

At least for living units connected to the shared receiving system $R_s$, the DET 100 also includes a selectable channel 3/4 notch filter 140 and an RF combiner 143, as shown in FIG. 8. The notch filter 140 connects directly to the coaxial cable network 34. At installation, the user sets a switch selecting either channel 3 or channel 4, and the RF modulator 139 thereafter outputs the standard RF television signal produced from the MPEG processor 125 on the selected TV channel 3 or 4. The switch setting also causes the notch filter 140 to block that signal from the combined RF signal received via the coaxial cable distribution network 34. The notch filter 140, however, passes all other channel signals received via the coaxial cable distribution network 34 through to the RF combiner 143.

The RF combiner combines the selected channel 3 or 4 signal from the modulator 139 together with the other channel signals supplied through the filter 140 and supplies those combined signals to the RF output. If the user connects the RF output to a coaxial cable or antenna lead type RF input to the television set 100', then the user can select any of the off-the-air channels supplied from the antenna 32 through the shared processing circuitry 33 and the distribution network 34 simply by tuning the television set 100' to the appropriate channel. To view the digital programming, the user tunes the television set 100' to channel 3 or activates the display of information received through baseband inputs and then selects the program via the DET 100, in the manner discussed above.

Figure 10:
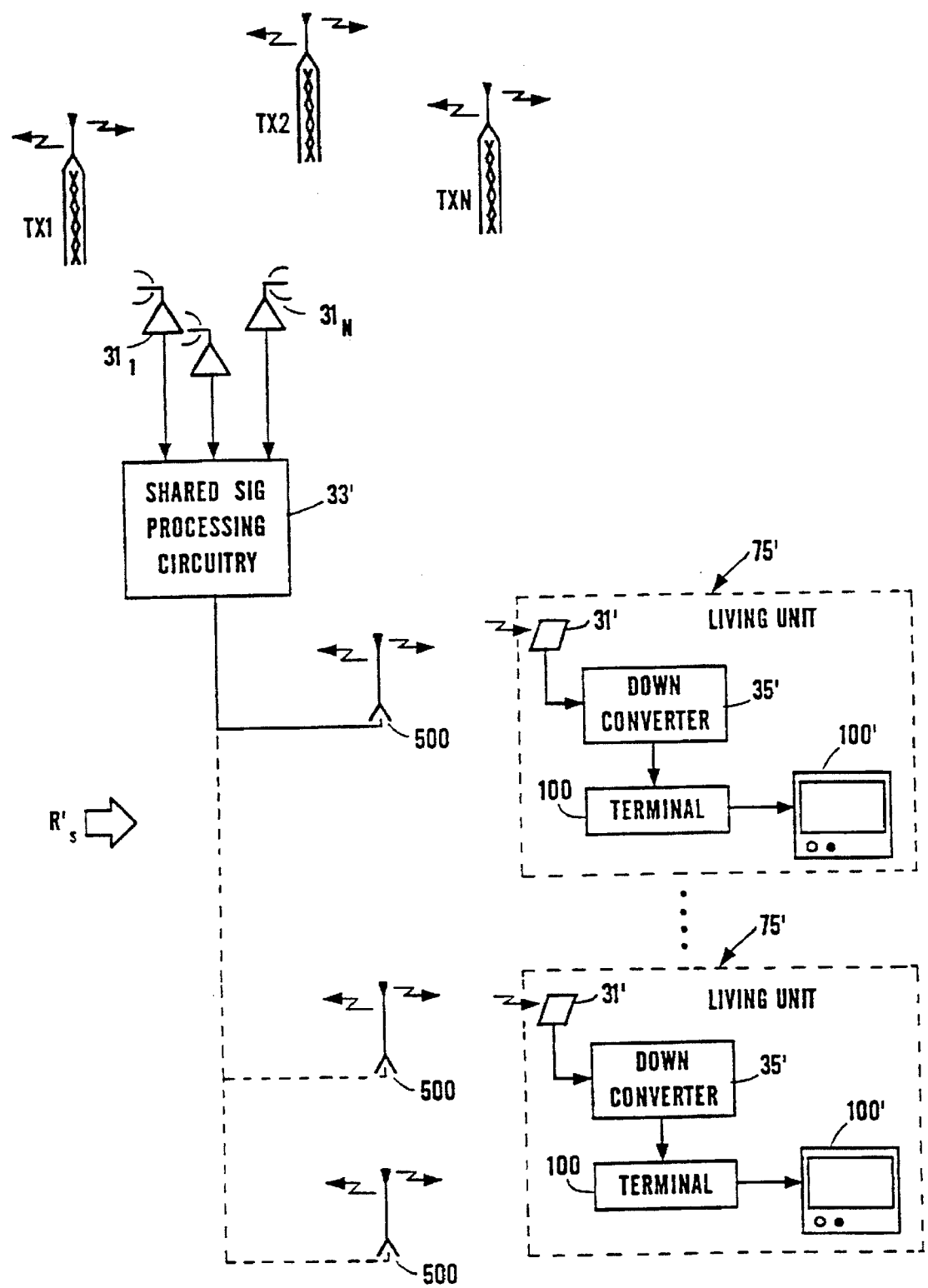
FIG. 10 illustrates the high-level functional elements of an alternate embodiment of a shared antenna and signal processing system used in accord with the present invention.

As noted above with regard to FIG. 7, the distribution from the shared signal processing circuitry to the living units may take a number of different forms other than the illustrated coaxial cable network. The distribution, for example, may utilize ADSL transport over twisted wire pair as disclosed in commonly assigned patent application Ser. No. 08/233,579 filed Apr. 26, 1994 entitled "Extended Range Video On Demand Distribution System", the disclosure of which is incorporated herein in its entirely by reference. FIGS. 10 to 10B depict a preferred alternate embodiment utilizing a microwave retransmission technique.

As shown in FIG. 10, the shared receiving system $R_s'$ includes the plurality of microwave receiving antennae, preferably antennae $31_1$ to $31_N$ located and directed towards the transmitters TX1 to TXN, exactly as discussed above with regard to FIG. 7. The shared signal processing circuitry 33' functions in a manner similar circuitry 33 in FIG. 7, except that the resultant combined spectrum signal distributed from the circuitry 33' consists of channels in the microwave frequency range. Specifically, the shared signal processing circuitry 33' supplies the combined spectrum signal containing the microwave channels to one or more antennae 500. Exemplary systems for use as the shared signal processing circuitry 33' are discussed below with regard to FIGS. 10A and 10B.

The signals supplied to the antennae 500 are relatively low power. Also, the mast height of the antennae 500 is relatively low. If a single rebroadcasting antenna 500 is used, that antenna may be at a relatively low position on the same mast as one or more of the microwave receiving antennae $31_1$ to $31_N$ or at any other convenient location visible from the living units 75'. Alternatively, a plurality of rebroadcasting antennae 500 may be located at convenient points about a relatively small area serviced by the shared receiving system $R_s'$, e.g. on telephone poles throughout the area.

The transmissions from the shared signal processing circuitry 33' and the one or more antennae 500 may utilize the same microwave frequencies as the simulcast transmissions from the transmitters TX1 to TXN. Due to the low mast height of the rebroadcast antennae 500 and the low power level of the transmission from those antennae, this rebroadcasting will cause little or no interference with the primary transmissions form the transmitters TX1 to TXN in areas around the shared receiving system $R_s'$.

In this embodiment, each living unit serviced by the shared receiving system has a small directional antenna. These receiving antennae may be small dish antennae, such as the antenna 31 used in the single home installation shown in FIG. 7. However, as shown in FIG. 10, this embodiment of the shared system preferably utilizes small microwave directional antenna arrays 31'. A small directional array is sufficient here because of the relatively short transmitter to receiver distances involved.

At installation in one of the living units 75', a user or a technician mounts the array 31' in a window of the living unit 75' facing one of the rebroadcasting antennae 500. The antenna array 31' supplies microwave signals to a block downconverter 35'. The block downconverter 35' converts the microwave signal from the range used by the system $R_s'$ (e.g. 2.1–2.7 GHz if reusing frequencies, or higher frequencies such as around 40 GHz if utilizing that range as an alternate band for retransmission). Specifically, downconverter 35' converts the microwave signal containing all of the RF channels, back down to the video channel band of 50–450 MHz. The block downconverter supplies the 50–450 MHz combined spectrum signal via a coaxial cable to one or more terminal devices 100 located at various places in the living unit 100'. The living unit 75' may have only one terminal, but in many instances, the signals will be distributed within the unit to up to four terminals located throughout the unit at desirable television viewing locations.

The terminal 100 in the living unit 100' may be identical to that used in the earlier embodiment of the shared reception system. However, the terminal need not include the notch filter 141 and RF combiner 143 unless there is some other source of off-the-air signals.

Figure 10A:
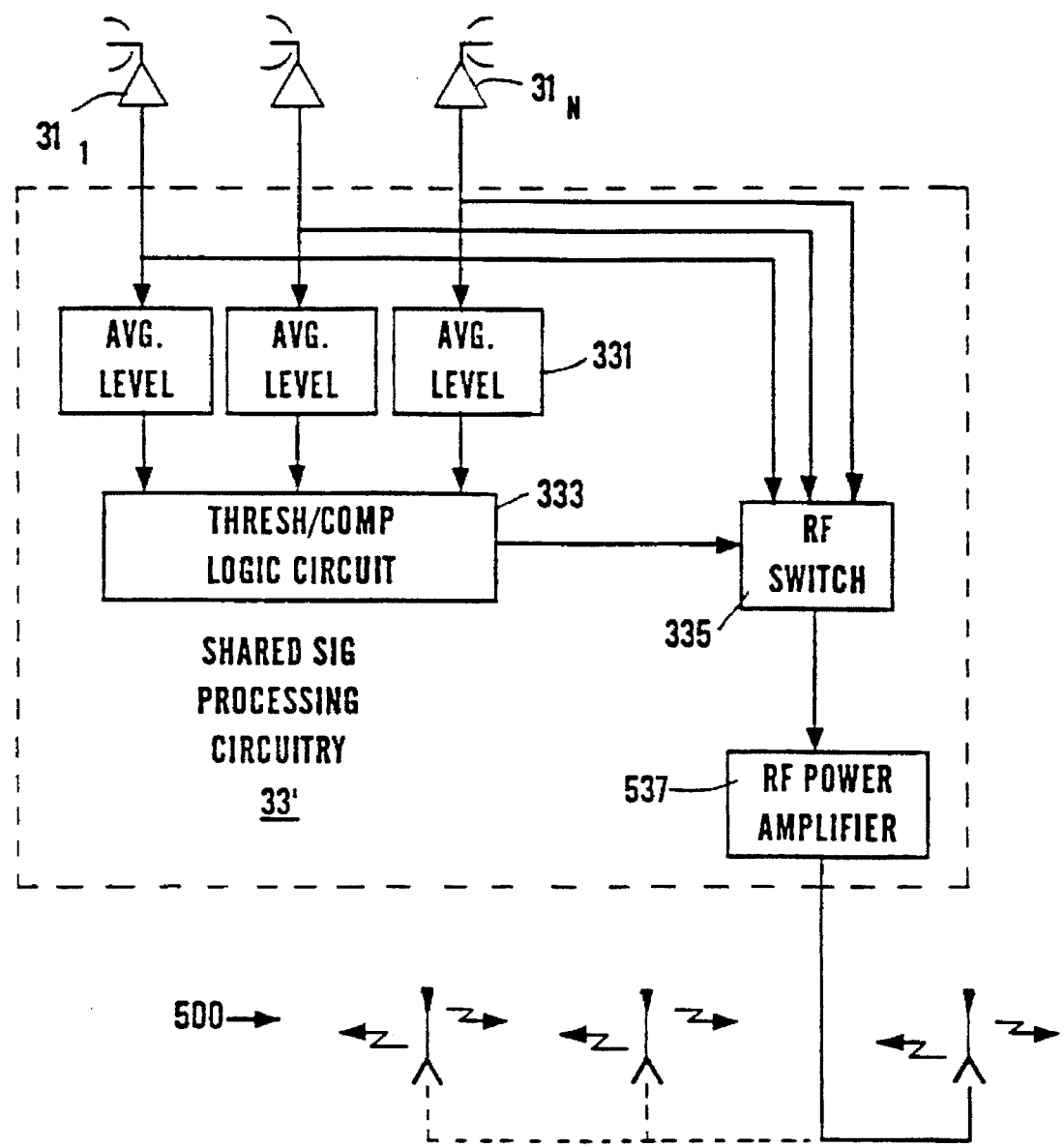
FIGS. 10A and 10B are more detailed functional diagrams of two examples of shared signal processing circuitry used in the shared receiving system illustrated in FIG. 10.
Figure 10B:
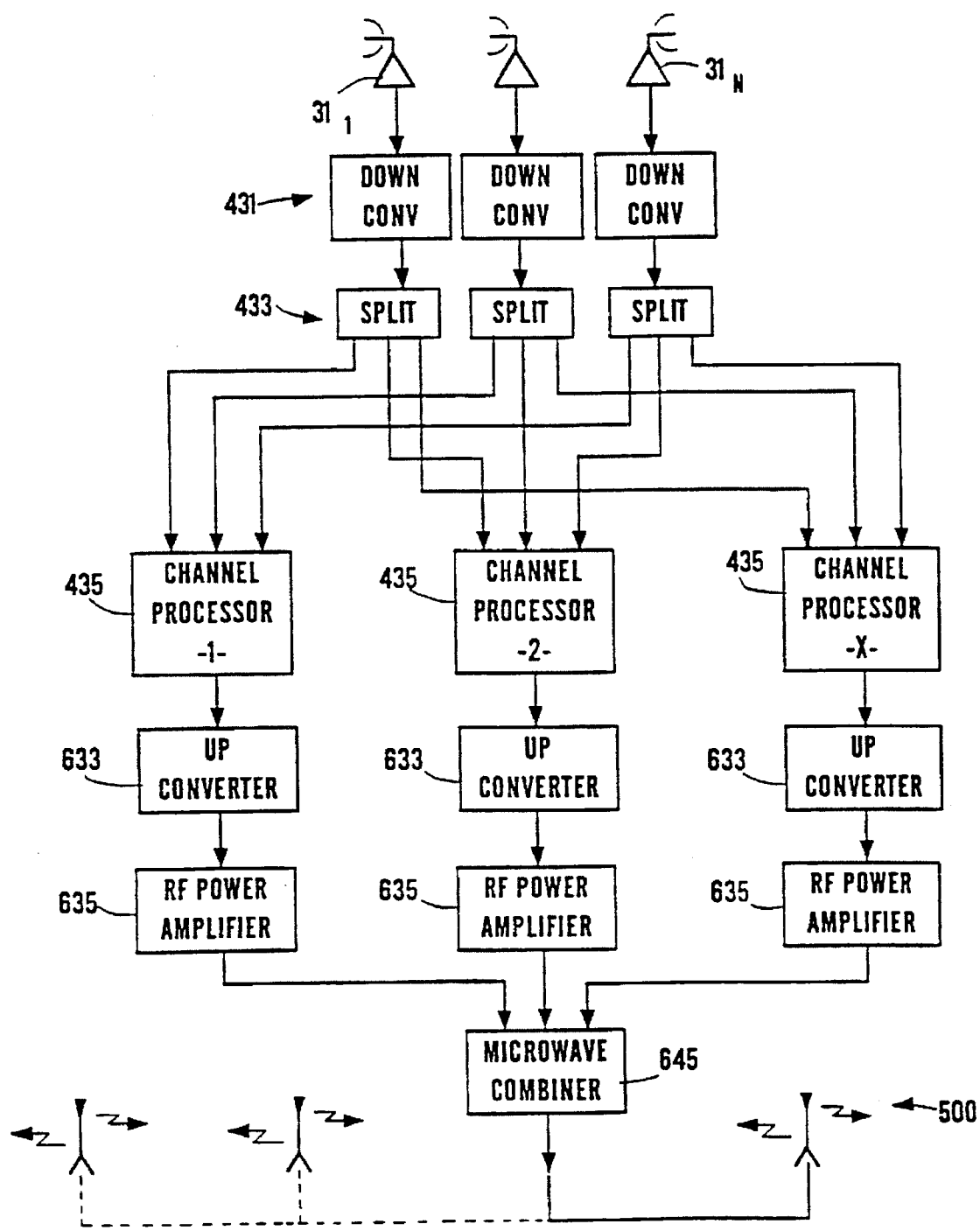

FIG. 10A shows a first example of the shared signal processing circuitry for use in the shared reception system $R_s'$ depicted in FIG. 10. The circuitry 33' includes average level detecting circuits 331, a threshold detector, comparator and logic circuit 333, and an RF switch 335 which function exactly as the correspondingly numbered components of the circuitry shown in FIG. 7A. Specifically, the logic of circuit 333 controls the switch 335 to selectively output a strong one of the antenna signals that is above the threshold, and changes to the new strongest signal above threshold if the previously selected signal falls below the threshold.

The RF switch 335, in the FIG. 10A embodiment, outputs the selected one of the signals from the microwave receiving antenna $31_1$ to $31_N$ to an RF power amplifier 537. The amplifier 537 amplifies the selected combined spectrum signal containing all of the digital broadcast channels in the 2.1 to 2.7 GHZ band to appropriate power levels for retransmissions and supplies the signal to one or more rebroadcasting antennae 500. This results in retransmission of the digital broadcast channels on the same RF channels as used for the transmissions from transmitters TX1 to TXN to the antennae $31_1$ to $31_N$. If the retransmission will utilize a different frequency band, e.g. somewhere in the 40 GHz range, then the shared signal processing circuity 33' would include one or more converters (not shown) to convert the channels in the signal from the RF switch 335 to the appropriate channels in the desired frequency range.

FIG. 10B shows a second example of the shared signal processing circuitry for use in the shared reception system $R_s'$ depicted in FIG. 10. In this embodiment, the downconverters 431, the splitters 433 and the channel processors 435 function exactly as the correspondingly numbered components of the circuitry shown in FIG. 7B. As a result, each channel processor 435 will output a single optimally selected RF channel in the 50–450 MHz range carrying one of the digital transport streams.

For each selected 6 MHz channel signal from one of the processors 435, one of the upconverters 633 converts that channel into one of the channels in the microwave range available for the rebroadcast transmissions. This conversion may place the channel signal back in one of the available wireless cable channels in the 2.1 to 2.7 GHz range. Alternatively, the conversion by each upconverter 633 may place the channel signal in an the available microwave cable channel in some other range of the spectrum, e.g. somewhere around 40 GHz.

An RF power amplifier 635 amplifies each upconverted channel signal and supplies the amplified channel signal to an input of a microwave combiner. The microwave combiner 25 combines the channel signals back into a combined spectrum signal in the appropriate microwave range, amplifies the signal and supplies that combined signal to one or more microwave broadcasting antennae 500.

The above discussion has concentrated on the preferred embodiment which broadcasts video programming. It should be noted, however, that the system may transport other types of programming, such as audio, data and/or telemetry.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A communication system comprising:
 a plurality of transmitters located at spaced apart sites transmitting a signal including multiplexed channels so that areas of propagation from respective ones of the transmitters substantially overlap over each other in at least a major portion of a reception area; and
 a receiver system located within the reception area and serving a plurality of living units, said receiver system comprising:
  (1) at least two directional receiving antennae, each directional receiving antenna being directed to receive said signal from a different one of the transmitters;
  (2) signal processing circuitry receiving a signal from each of the receiving antennae and in response thereto outputting a single representation of said signal including multiplexed channels; and
  (3) terminals located in a plurality of the living units, each terminal receiving the single representation of said signal including multiplexed channels from the signal processing circuitry and processing a selected one of the multiplexed channels of the single representation of said signal to present program information from a selected channel.

2. A communication system as in claim 1, wherein said signal processing circuitry comprises means responsive to the level of signals from the receiving antennae for selecting a signal from one of the receiving antennae as the single representation of said signal including multiplexed channels.

3. A communication system as in claim 1, wherein said signal processing circuitry comprises:

a plurality of channel processors, each of the channel processors processing signals from the receiving antenna to output a single representation of one of the multiplexed channels; and
 a combiner for combining the representations of the channels output by the channel processors to form the single representation of said signal including multiplexed channels.

4. A communication system as in claim 3, wherein each channel processor comprises:
 a plurality of filters, each filter receiving an output from a respective one of the receiving antennae and selecting a predetermined one of the multiplexed channels; and
 means responsive to signal level of the predetermined one of the multiplexed channels from each of the receiving antennae for selecting a signal representing the predetermined one of the multiplexed channels from one of the receiving antennae as the single representation of the predetermined one of the multiplexed channels.

5. A communication system as in claim 1, further comprising a distribution system for supplying the single representation of said signal including multiplexed channels to the terminals.

6. A communication system as in claim 5, wherein said distribution system comprises a coaxial cable broadcasting system transporting the single representation of said signal including multiplexed channels from the signal processing circuitry to the terminals.

7. A communication system as in claim 5, wherein said distribution system comprises:
 at least one wireless transmitting antenna for local broadcasting of the single representation of said signal including multiplexed channels from the signal processing circuitry; and
 a plurality of wireless receiving antenna, each of which is responsive to the local broadcast for supplying the single representation of said signal including multiplexed channels to at least one the terminals.

8. A communication system as in claim 1, further comprising a headend producing the signal including multiplexed channels such that each multiplexed channel includes a digital transport stream containing information relating to a plurality of programs.

9. A communication system as in claim 8, wherein each terminal comprises:
 (i) an interface module responsive to the single representation of said signal including multiplexed channels for selecting one of the multiplexed channels and acquiring a digital transport stream from the selected channel, and
 (ii) a digital signal processing section for processing a portion of the acquired digital transport stream associated with a selected program to present information relating to the selected program.

10. A communication system as in claim 9, further comprising an output device responsive to information presented by said digital signal processor to output information relating to the selected program to a user in sensorially perceptible form.

11. A communication system as in claim 10, wherein said output device comprises a video display.

12. A communication system as in claim 1, further comprising an off-the-air receiving antenna receiving program signals broadcast from other transmitters providing off-the-air program services in the reception area, wherein the signal processing circuitry includes means for merging at least one channel signal from the off-the-air receiving antenna with the single representation of said signal including multiplexed channels into a combined signal.

13. A communication system as in claim 12, further comprising a distribution system for supplying the combined signal to the terminals in the living units.

14. A communication system as in claim 13, wherein said distribution system comprises a coaxial cable broadcasting system transporting the combined signal from the signal processing circuitry to the terminals.

15. A communication system comprising:

a headend comprising:
   (1) a source of a first digital multiplexed data stream containing a plurality of packet streams, each packet stream carrying digitized data representing one of a first group of video programs,
   (2) a source of a second digital multiplexed data stream containing a plurality of packet streams, each packet stream carrying digitized data representing one of a second group of video programs,
   (3) a modulation system modulating the first digital multiplexed data stream and the second digital multiplexed data stream into first and second channels, respectively;

a plurality of wireless transmitters located at respective different sites in a service area, the transmitters simultaneously transmitting a combined wireless signal containing the first and second channels into overlapping portions of the service area; and a plurality of receiver systems within the service area, at least one of the receiver systems serving a plurality of living units, said at least one of the receiver systems comprising:
   (i) at least two directional receiving antennae, each directional receiving antenna being directed to receive said combined wireless signal from a different one of the transmitters,
   (ii) signal processing circuitry receiving signals from the receiving antennae and in response thereto outputting a single representation of a combined signal containing the first and second channels, and
   (iii) terminals located in a plurality of the living units, each terminal comprising (a) an interface module processing the single representation to select one of the first and second channels thereof and acquire a digital multiplexed data stream from the selected channel, and (b) a digital signal processing section for processing digitized data from a selected packet stream contained in the acquired digital multiplexed data stream to present a selected video program to a viewer.

16. A communication system as in claim 15, wherein the interface module comprises:

means for selectively receiving one of the one of the first and second channels from the single representation; and means for demodulating the selectively received channel.

17. A communication system as in claim 16, wherein:

each of the at least two directional receiving antennae receives a plurality of differently time delayed representations of the combined wireless signal;

the single representation includes a plurality of differently time delayed representations of the first and second channels; and each terminal further comprises means for processing the plurality of time delayed representations of the selected one of the first and second channels to produce a single copy of the acquired digital multiplexed data stream for output to the digital signal processing section.

18. A communication system as in claim 17, wherein the means for processing comprises a digital time delay equalizer within the interface module.

19. A communication system as in claim 15, wherein at least one of the sources comprises:

a plurality of encoders responsive to analog audio and video information for producing packets of digitized, compressed audio and video data; and a multiplexer multiplexing packets of digitized, compressed audio and video data from the plurality of encoders into one digital multiplexed data stream.

20. A communication system as in claim 15, wherein said modulation system comprises:

a first modulator for modulating the first digital multiplexed data stream into the first channel;

a second modulator for modulating the second digital multiplexed data stream into the second channel; and a combiner combining output signals from the first and second modulators into a combined spectrum signal and supplying the combined spectrum signal to each of the transmitters for transmission as said combined wireless signal.

21. A communication system as in claim 20, wherein each of the first and second modulators comprises a quadrature amplitude modulator, and each interface module includes a quadrature amplitude demodulator.

22. A communication system as in claim 20, further comprising converter means for converting the first and second channel signals to microwave frequency range channels.

23. A communication system as in claim 15, further comprising a transmission network between the modulation system and the wireless transmitters for transmitting a first copy of the combined wireless signal through a first path to arrive at a broadcast antenna at a first one of the transmitters after a known time period, and for transmitting and delaying a second copy of the combined wireless signal through a second path to arrive at a broadcast antenna at a second one of the transmitter sites after said time period.

24. A communication system as in claim 23, wherein the transmission network comprises optical fibers connected between the transmitters and the modulation system.

25. A system as in claim 15, wherein at least one of the wireless transmitters includes a delay device for delaying the first channel such that first channel signals in the transmissions from the wireless transmitters are synchronized and in phase.

26. A system as in claim 25, wherein at least one of the wireless transmitters includes a delay device for delaying the second channel such that second channel signals in the transmissions from the wireless transmitters are synchronized and in phase.

27. A system as in claim 15, further comprising at least one additional receiving system, said additional receiving system comprising:
   (i) a single directional receiving antennae directed to receive said combined wireless signal from one of the transmitters; and
   (ii) a terminal comprising: (a) another interface module processing a signal from the single directional receiving antennae to select one of the first and second channels and acquire one digital multiplexed data stream from the channel selected by said another interface module, and (b) another digital signal processing section for processing digitized data from a selected packet stream contained in the one digital multiplexed data stream acquired by said another interface module to present a selected video program to a viewer.

28. A shared receiving system serving a plurality of living units, said shared receiving system comprising:

at least two directional receiving antennae, each directional receiving antenna being directed to receive a signal including multiplexed channels from a different one of a plurality of spaced apart transmitters which provide overlapping simultaneous broadcasts of the signal including multiplexed channels;

signal processing circuitry receiving a signal from each of the receiving antennae and in response thereto outputting a single representation of said signal including multiplexed channels;

a distribution system for broadcasting the single representation of said signal; and terminals located in a plurality of the living units, each terminal receiving the single representation of said signal including the multiplexed channels via the distribution system and processing a selected one of the multiplexed channels of the single representation of said signal to present program information from the selected channel.

29. A system as in claim 28, wherein said signal processing circuitry comprises means responsive to the level of signals from the receiving antennae for selecting a signal from one of the receiving antennae as the single representation of said signal including multiplexed channels.

30. A system as in claim 28, wherein said signal processing circuitry comprises:

a plurality of channel processors, each of the channel processors processing signals from the receiving antenna to output a single representation of one of the multiplexed channels; and a combiner for combining the representations of the multiplexed channels output by the channel processors to form the single representation of said signal including multiplexed channels.

31. A system as in claim 30, wherein each channel processor comprises:

a plurality of filters, each filter receiving an output from a respective one of the receiving antennae and selecting a predetermined one of the multiplexed channels; and means responsive to signal level of the predetermined one of the multiplexed channels from each of the receiving antennae for selecting a signal representing the predetermined one of the multiplexed channels from one of the receiving antennae as the single representation of the predetermined one of the multiplexed channels.

32. A system as in claim 28, wherein said distribution system comprises a coaxial cable broadcasting system transporting the single representation of said signal including multiplexed channels from the signal processing circuitry to the terminals.

33. A system as in claim 28, wherein said distribution system comprises:

at least one wireless transmitting antenna for local broadcasting of the single representation of said signal including multiplexed channels from the signal processing circuitry; and a plurality of wireless receiving antenna, each of which is responsive to the local broadcast for supplying the single representation of said signal including multiplexed channels to at least one the terminals.

34. A system as in claim 28, further comprising a headend producing the signal including multiplexed channels such that each multiplexed channel includes a digital transport stream containing digitized information relating to a plurality of programs.

35. A system as in claim 34, wherein each terminal comprises:

(i) an interface module responsive to the single representation of said signal including multiplexed channels for selecting one of the multiplexed channels and acquiring a digital transport stream from the selected channel, and (ii) a digital signal processing section for processing a portion of the acquired digital transport stream associated with a selected program to present information relating to the selected program.

36. A system as in claim 35, further comprising an output device responsive to information presented by said digital signal processor to output information relating to the selected program to a user in sensorially perceptible form.

37. A system as in claim 36, wherein said output device comprises a video display.

38. A system as in claim 28, further comprising an off-the-air receiving antenna receiving program signals broadcast from other transmitters providing off-the-air program services, wherein the signal processing circuitry includes means for merging at least one channel signal from the off-the-air receiving antenna with the single representation of said signal including multiplexed channels into a combined signal.

39. A method comprising the steps of:

a) simultaneously transmitting from multiple spaced transmitting sites the same signal so that areas of propagation from respective ones of the transmitting sites substantially overlap over each other in at least a major portion of a reception area, said signal transmitted from said transmitting sites including multiplexed channels, each channel carrying digitally multiplexed data representing a plurality of programs;

b) at one receiving site in the major portion of said reception area, directionally receiving a signal from each of the transmitting sites;

c) from the signals received from the transmitting sites, producing a single representation of said signal including multiplexed channels;

d) distributing the single representation of said signal to a plurality of living units; and e) in at least one living unit, processing a selected portion of the digitally multiplexed data carried in a selected one of the multiplexed channels of the single representation of said signal to present information from a selected one of the programs.

40. A method as in claim 39, wherein the step of distributing comprises broadcasting the single representation of said signal including multiplexed channels through a cable to the living units.

41. A method as in claim 39, wherein the step of distributing comprises wireless broadcasting of the single representation of said signal including multiplexed channels to the living units.

42. A method as in claim 41, wherein the wireless broadcasting of the single representation of said signal including multiplexed channels to the living units utilizes frequency channels utilized by the multiple spaced transmitting sites.

43. A method as in claim 41, wherein the wireless broadcasting of the single representation of said signal including multiplexed channels to the living units utilizes frequency channels different from frequency channels utilized by the multiple spaced transmitting sites.

44. A method as in claim 41, wherein the wireless broadcasting of the single representation of said signal including multiplexed channels utilizes a plurality of transmitting antennae.

45. A method as in claim 39, wherein the step of producing a single representation of said signal including multiplexed channels comprises:

determining the level of the signals received from respective transmitting sites through corresponding directional receiving antennae; and based on the level detection, selecting a signal from one of the directional receiving antennae as the single representation of said signal including multiplexed channels.

46. A method as in claim 39, wherein the step of producing a single representation of said signal including multiplexed channels comprises:

from an output from each of a plurality of directional receiving antennae directed at different transmitter sites, selecting a first one of the multiplexed channels;

determining the level of the first channel from the output from each directional receiving antenna;

based on the level detection relative to the first channel, selecting a signal representing the first channel from one of the receiving antennae as a single representation of the first channel;

from an output from each of the directional receiving antennae, selecting a second one of the multiplexed channels;

determining the level of the second channel from the output from each directional receiving antenna;

based on the level detection relative to the second channel, selecting a signal representing the second channel from one of the receiving antennae as a single representation of the second channel; and combining the single representation of the first channel with the single representation of the second channel to form the single representation of said signal including multiplexed channels.

\* \* \* \* \*